United States Patent
Kobayashi et al.

(10) Patent No.: US 7,447,800 B2
(45) Date of Patent: Nov. 4, 2008

(54) MOBILE ROUTER DEVICE, MOBILE NETWORK SYSTEM, AND MOBILITY MANAGEMENT METHOD OF MOBILE ROUTER DEVICE

(75) Inventors: Hirokazu Kobayashi, Kawasaki (JP); Taisuke Matsumoto, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 521 days.

(21) Appl. No.: 10/525,059

(22) PCT Filed: Feb. 18, 2004

(86) PCT No.: PCT/JP2004/001810

§ 371 (c)(1),
(2), (4) Date: Feb. 18, 2005

(87) PCT Pub. No.: WO2004/075491

PCT Pub. Date: Sep. 2, 2004

(65) Prior Publication Data

US 2006/0080460 A1     Apr. 13, 2006

(30) Foreign Application Priority Data

Feb. 20, 2003  (JP)  ............................. 2003-042875
Feb. 12, 2004  (JP)  ............................. 2004-034695

(51) Int. Cl.
*G06F 15/173* (2006.01)
*H04L 12/56* (2006.01)
*H04L 12/28* (2006.01)

(52) U.S. Cl. ...................................... 709/242; 370/389

(58) Field of Classification Search ................. 709/238, 709/230, 245, 242; 370/390, 338, 389, 400, 370/401
See application file for complete search history.

(56) References Cited

U.S. PATENT DOCUMENTS 6,397,260 B1 *  5/2002  Wils et al. .................... 709/238
6,636,498 B1 * 10/2003  Leung .......................... 370/338
6,721,297 B2 *  4/2004  Korus et al. .................. 370/338

(Continued)

FOREIGN PATENT DOCUMENTS

JP      09-172451      6/1997

(Continued)

OTHER PUBLICATIONS

International Search Report for application No. PCT/JP2004/001810 dated Jun. 1, 2004.

(Continued)

*Primary Examiner*—Andrew Caldwell
*Assistant Examiner*—Barak Nissan
(74) *Attorney, Agent, or Firm*—RatnerPrestia

(57) ABSTRACT

A mobile router device connects a mobile network containing several terminal devices and moving in a backbone network with the backbone network. The mobile router device decides whether to operate as a master router which is a router for actually connecting the mobile network with the backbone network. The mobile router device records a virtual address and produces a care of address which is an address that the mobile router can use at the moving destination. The mobile router device generates and transmits a binding update message for correlating the virtual address to the care of address when the mobile router device operates as the master router.

18 Claims, 30 Drawing Sheets

U.S. PATENT DOCUMENTS

| | | | |
|---|---|---|---|
| 6,868,089 B1 * | 3/2005 | Watanuki et al. | 370/466 |
| 7,031,709 B2 * | 4/2006 | Watanabe et al. | 455/436 |
| 7,080,151 B1 * | 7/2006 | Borella et al. | 709/230 |
| 7,203,761 B1 * | 4/2007 | Rai et al. | 709/238 |
| 7,234,001 B2 * | 6/2007 | Simpson et al. | 709/239 |
| 2002/0184387 A1 * | 12/2002 | Yamaya et al. | 709/238 |
| 2003/0037165 A1 * | 2/2003 | Shinomiya | 709/238 |
| 2004/0162914 A1 * | 8/2004 | St. Pierre et al. | 709/245 |

FOREIGN PATENT DOCUMENTS

| | | |
|---|---|---|
| JP | 2002-290445 | 10/2002 |
| JP | 2004-080106 | 3/2004 |

OTHER PUBLICATIONS

Research of Seamless Handover Method for Moving Network, Taisuke Matsumoto et al., The Instittue of Electronics, Information and Communication Engineers, Technical Report Of IEICE, NS2002-323, IN2002-296, Feb. 28, 2003 (w/English Abstract).

Detailed Illustration Of IPv6 Expert Guide, Hiroshi Ezaki et al., Shuwa System Co., Ltd.—Publisher, May 25, 2002, Chapter 2.12, pp. 96-99 (w/Translation).

\* cited by examiner

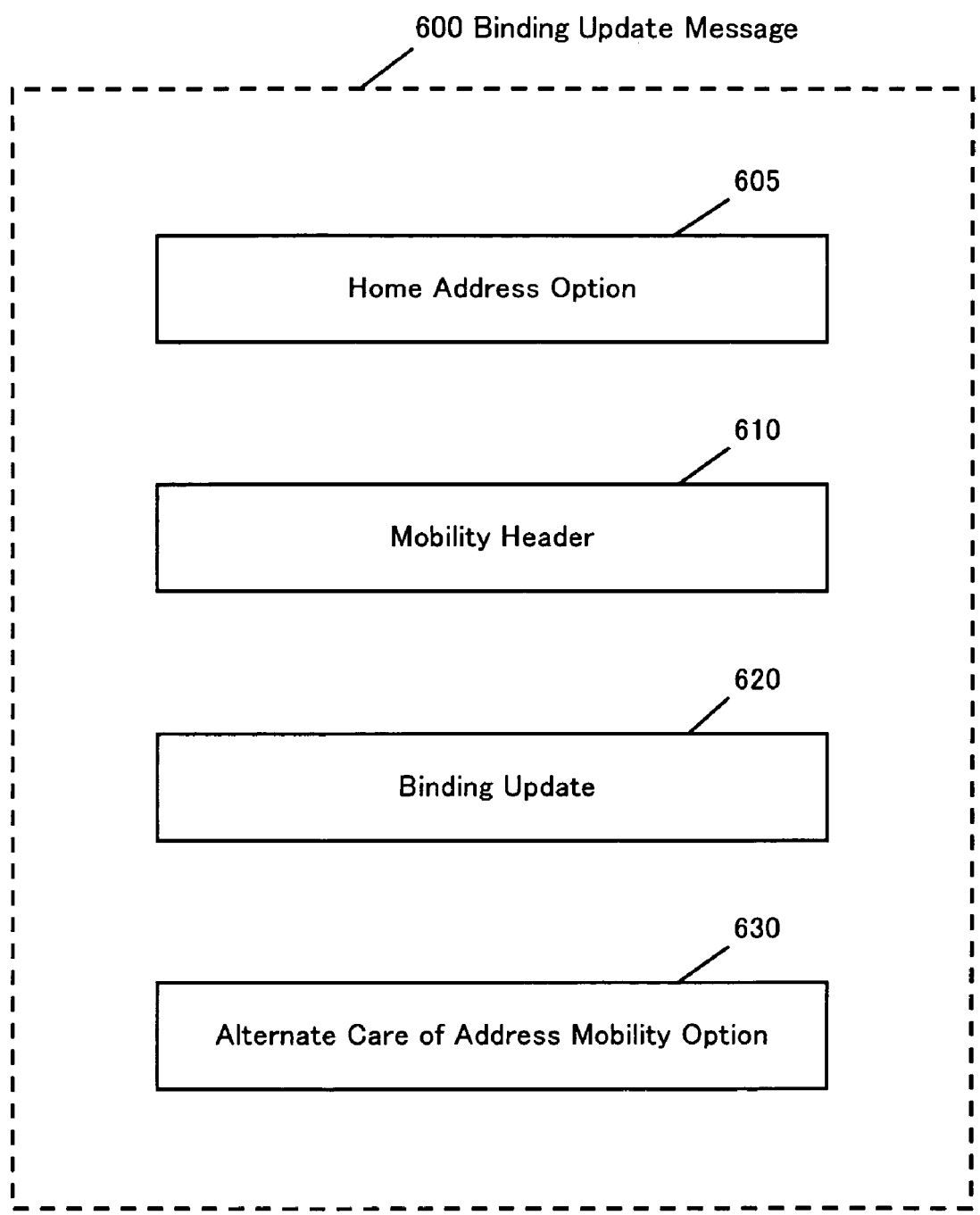

MOBILE ROUTER DEVICE, MOBILE NETWORK SYSTEM, AND MOBILITY MANAGEMENT METHOD OF MOBILE ROUTER DEVICE

This Application is a U.S. National Phase Application of PCT International Application PCT/JP2004/001810.

TECHNICAL FIELD

The present invention relates to a mobile router device, to which at least one terminal device attaches, moving in a backbone network for connecting the terminal device to the backbone network. It also relates to a mobile network system containing the mobile router device and the terminal device, and a mobility management method of the mobile router device.

BACKGROUND ART

A communication method of a terminal device moving within the Internet system is disclosed as Mobile IPv6 (Mobile Internet Protocol version 6) in a book titled "Detailed Illustration of IPv6 Expert Guide" written by Messrs. Hiroshi Ezaki, Yuji Sekiya, Hideaki Yoshifuji, and Tomohiro Ishihara, published from Shuwa System Co., Ltd. on May 25, 2002. The related article to the present invention appears in this book at page 96-99. This protocol allows a terminal device moving between dissimilar networks to communicate with others using the same address.

In Mobile IPv6 environment, when a terminal device leaves its home link to which this device primarily attaches, the device obtains prefix information transmitted from an access router of the present link, about the present foreign link, thereby generating a care of address to be temporarily used in the present foreign link from its primary home address and the prefix information.

Then the device transmits a binding update message to its home agent, thereby registering the care of address as a primary care of address with the home agent on the home link of the device. The home agent receives the binding update message from the terminal device, then generates or updates a binding cache which associates the home address with the care of address.

The home agent refers to the binding cache for receiving, as a proxy for the terminal device, a packet addressed to the home address on the home link of the terminal device, then encapsulates the packet for forwarding it to the care of address of the terminal device. The terminal device decapsulates the capsule forwarded by the home agent for receiving the packet originally addressed to its home address.

Mobile IPv6 has been designed with a mobile terminal device in mind; however, not with a mobile network, i.e. it is not assumed that a network as a whole moves among different networks. In such a case, a terminal device must carry out the process discussed above for itself.

Japanese patent application non-examined publication No. H09-172451 discloses the following communication method of a terminal device attached to a mobile network: A virtual IP (VIP) address, i.e. a home address that does not change while the terminal device moves among various networks, is given to the mobile router in addition to an address corresponding to a care of address, i.e. an Internet Protocol (IP) address that changes in response to the movement of the device. The home agent refers to an address management table (AMT) that associates the VIP address with the IP address, then forwards a packet to the IP address. This method is hereinafter referred to as a VIP method.

In the VIP method environment, a predetermined mobile router device to which terminal devices attach, and the home agent that manages the AMT forwards a packet addressed to the terminal device to the IP address of the predetermined mobile router, so that the communication is carried out. The terminal devices within the mobile network need not carry out the process involved by the movement, so that the movement involves a simpler process in the environment of the VIP method than in the environment of Mobile IPv6 method.

However, if the predetermined mobile router device, to which terminal devices within a mobile network attach, is switched over to another mobile router, the VIP method requires the respective terminal devices to carry out the process involved by the movement. To be more specific, plural mobile router devices are prepared on the mobile network as nodes between an access router on the Internet and the mobile network. If a defective is found in a present mobile router device or if a connection is lost between the Internet and the present mobile router device, the present mobile router device is switched to another mobile router device, so that the another one takes over the function of the present one. At this time, the predetermined mobile router loses the connection to the terminal devices, and the terminal devices move to this another mobile router device. Therefore, the respective terminal devices must carry out the process for associating their home addresses with care of addresses to their home agent. This process increases the load to the network, and it is impossible for all the terminal devices to register physical addresses, so that it takes a considerably long time for some terminal devices to register the physical address with the home agent.

DISCLOSURE OF INVENTION

In a mobile network that moves among plural access networks for connecting its terminal devices to a backbone network, and under the environment where plural mobile router devices are prepared in the mobile network for connecting the mobile network to the access networks, the present invention aims to provide a mobile network system, a mobile router device, and a mobility management method of the mobile router device, which can switch over the mobile router device without increasing a load to the network.

In order to achieve the foregoing objective, the mobile router device of the present invention connects a backbone network to a mobile network to which at least one terminal device attaches and moves within the backbone network. The mobile router device of the present invention comprises the following elements:

a means for determining whether or not the router device actually works as a master router that can connects the mobile network to the backbone network;

a means for recording a virtual address common to all the mobile router devices attaching to the mobile network, and originating a care of address, usable at a location to where the mobile router is connected, corresponding to the virtual address; and a means for originating and transmitting a binding update message that associates the virtual address with the care of address in the case of working the mobile router device as the master router device.

The structure discussed above allows eliminating the transmission of the binding update message for erasing obsolete information in the binding cache to be used for the mobile router device switched over to another one to manage the location information of the mobile router devices at the home agent, even if the mobile router device is switched over to another one in the mobile network. Actually a mobile router device, which carries out the connection to the Internet, simply updates the binding to the home network by using the same virtual address, thereby maintaining the communication between a terminal device in the mobile network and a correspondent node device.

At the home agent in the home network, the home address corresponding to the care of address, which indicates a location to where the mobile router device is connected, stays uniquely regardless of a switch over to another mobile router device, so that a distribution route needs no changes.

In the mobile router device of the present invention, a real address assigned to any one of respective mobile router devices attaching to the mobile network is used as a virtual address. This structure eliminates the need of providing a new common address, thereby taking less space in an address space. A non-functional mobile router device having no address pre-assigned can work as a functional mobile router device by using the virtual address.

A mobile router device of the present invention comprises the following elements:
 a means for monitoring the quality of a link connecting to a backbone network;
 a means for changing a priority of determining a master router and a backup router in response to the quality of the link; and
 a means for determining whether or not the router works as a master router in response to the priority.

The structure discussed above allows the mobile router device having the best connection quality to the backbone network to work as a master router, so that a high quality communication can be expected while the router moves.

A mobile router device of the present invention includes a means for transmitting master router advertisement packet which stores a sequence number of a binding update message in case of the mobile router device is working as a master router. This structure allows inheriting an updated sequence number for processing the binding update, even when the mobile router device, which updates the binding to the home agent, is switched over to another one among plural mobile router devices provided in a mobile network. As a result, it can be guaranteed that the message contains updated information, and the home agent can be prevented from disposing of the information as obsolete one.

A mobile router device of the present invention comprises the following elements while it works as a backup router:
 a means for receiving a master router advertisement packet transmitted by another mobile router device to notify that the router device is working as a master router; and
 a means for recording a sequence number of a binding update message contained in the master router advertisement packet received in order to use the number when it works as the master router.

This structure allows inheriting an updated sequence number for processing the binding update, even when the mobile router device, which updates the binding to the home agent, is replaced with another one among plural mobile router devices provided in a mobile network. As a result, it can be guaranteed that the message contains updated information, and the home agent can be prevented from disposing of the information as obsolete one.

A mobile router device of the present invention allows a master router advertisement packet to use a virtual advertisement specified by a virtual router redundancy protocol. This structure prevents the mobile router device using a virtual router redundancy protocol from transmitting a new message in order to notify other mobile router devices of an updated sequence number. As a result, it can be avoided that the number of messages to be transmitted in the mobile network increases.

A mobile router device of the present invention allows a master router advertisement packet to use an Ipv6 router advertisement message. This structure allows preventing the mobile router device working as a router device from transmitting a new message in order to notify other mobile router devices of an, updated sequence number. As a result, it can be avoided that the number of messages to be transmitted in the mobile network increases.

A mobile network system of the present invention comprises the following elements:
 plural mobile router devices;
 at least one terminal device attached to the mobile router devices; and
 a home agent device for managing a movement of the mobile router devices.

When a mobile router device cannot be connected to a backbone network but another one can be connected thereto, this structure allows switching the mobile router device to another one for maintaining the communication without adding a new process or a function to the terminal devices or the home agent.

A mobile network system of the present invention includes mobile router devices, and at least one of the devices has a different type of physical interface to the backbone network from those of the other mobile router devices. This structure allows maintaining the communication while the mobile network moves among various types of access networks.

A mobile network system of the present invention allows respective mobile router devices to use a common virtual address at the interface to the backbone network, and implement a virtual router redundancy protocol for the mobile network. The structure also allows a mobile router device working as a master router to use the common virtual address. This structure allows a home address, corresponding to a care of address indicating a location where a mobile router device has moved, to become unique regardless of switch over to another mobile router device. As a result, a change in a setting of a distribution route is not needed, and the switch over of the mobile router device does not involve any change in the terminal devices within the mobile network.

A mobile network system of the present invention allows that the mobile router which works as a master router transmits a binding update message to the home agent device. This binding update message includes a common virtual address and care of address generated corresponding to the common virtual address, and is to be used by a home agent for managing the movements of the mobile network. When a mobile router device is switched over to another one, this structure allows eliminating the necessity of transmitting a binding update message for erasing obsolete information in a biding cache used by the mobile router device switched over to another one for managing the location information of the mobile router devices at the home agent. This structure allows that correspondent terminal device can maintain communication with a terminal device in the mobile network by only the mobile router device which actually connected to the Internet carrying out the binding update processing to the home network using the common virtual address. At the home agent in the home network, a home address corresponding to a care of address indicating where the mobile router device has moved becomes unique regardless of a switch over to a mobile router device, so that no change is required in a setting of the distribution route.

A mobility management method of mobile router device of the present invention manages movements of a mobile router device in a mobile network system, which system comprises the following elements:
- a mobile network including at least one terminal device and plural mobile router devices, to which the terminal device attaches, for connecting the terminal devices to a backbone network; and
- a home agent device that manages a home address and a care of address by associating those addresses with each other.

When a mobile network is coupled to its home network, a virtual address to be used in a physical interface of the mobile network connected to the backbone network and to be generated after the movement of a mobile router device working as a master router and a care of address corresponding to the virtual address are registered with the home agent device by associating those addresses with each other. When a mobile router having worked as a backup router is switched over to working as a master router, a care of address corresponding to a virtual address and being generated after the change is associated with the virtual address and registered with the home agent device.

When the mobile network moves and the mobile router device that actually connects other mobile router devices to the backbone network is switched over to another one, the method discussed above allows the home agent to manage a plurality of mobile router devices as one mobile router device, i.e. equivalent to the case where the present mobile router device moves. As a result, a change in a setting of the distribution route is not needed.

In the case of switching over a mobile router device used in a mobile network to another one, this method allows eliminating the necessity of transmitting a binding update message for erasing obsolete information in a biding cache used by the mobile router device switched over to another one for managing the location information of the mobile router devices at the home agent. This structure allows that correspondent terminal device can maintain communication with a terminal device in the mobile network by only the mobile router device which actually connected to the Internet carrying out the binding update processing to the home network using a common virtual address.

A mobility management method of mobile router device of the present invention allows a virtual address to be any one of physical addresses to be used in respective mobile router devices attaching to a mobile network at their physical interfaces on their sides to the backbone network when they are to be coupled to their home network. This structure eliminates the need of providing a new common address, thereby taking less space in an address space. A non-functional mobile router device having no address assigned can work as a functional mobile router device using the virtual address.

A mobility management method of mobile router device of the present invention allows a master router advertisement packet, which is transmitted to the mobile network in order to notify the mobile router device works as a master router, to include the virtual address and a sequence number of a binding update message to be transmitted to the home agent device. This method allows inheriting an updated sequence number for processing the binding update, even when the mobile router device, which updates the binding to the home agent, is switched over to another one. As a result, it can be guaranteed that the message contains updated information, and the home agent can be prevented from disposing of the information as obsolete one.

A mobility management method of mobile router device of the present invention allows a master router advertisement packet to be a virtual advertisement packet to be used by a virtual router redundancy protocol carried out in the mobile router device at the mobile network side. This structure prevents respective mobile router devices using a virtual router redundancy protocol from transmitting a new message in order to notify other mobile router devices of an updated sequence number. As a result, it can be avoided that the number of messages to be transmitted in the mobile network increases.

A mobility management method of mobile router device of the present invention allows a master router advertisement packet to be an IPv6 router advertisement message which is transmitted by the mobile router device, working as a master router, to its mobile network side. This method allows preventing the mobile router device working as a master router device from transmitting a new message in order to notify other mobile router devices of an updated sequence number. As a result, it can be avoided that the number of messages to be transmitted in the mobile network increases.

BRIEF DESCRIPTION OF DRAWINGS

FIG. 6 shows a structure of a binding update message in accordance with the first exemplary embodiment of the present invention.

DESCRIPTION OF THE PREFERRED EMBODIMENTS OF THE INVENTION

Exemplary embodiments of the present invention are demonstrated hereinafter with reference to the accompanying drawings.

Exemplary Embodiment 1

Figure 1:
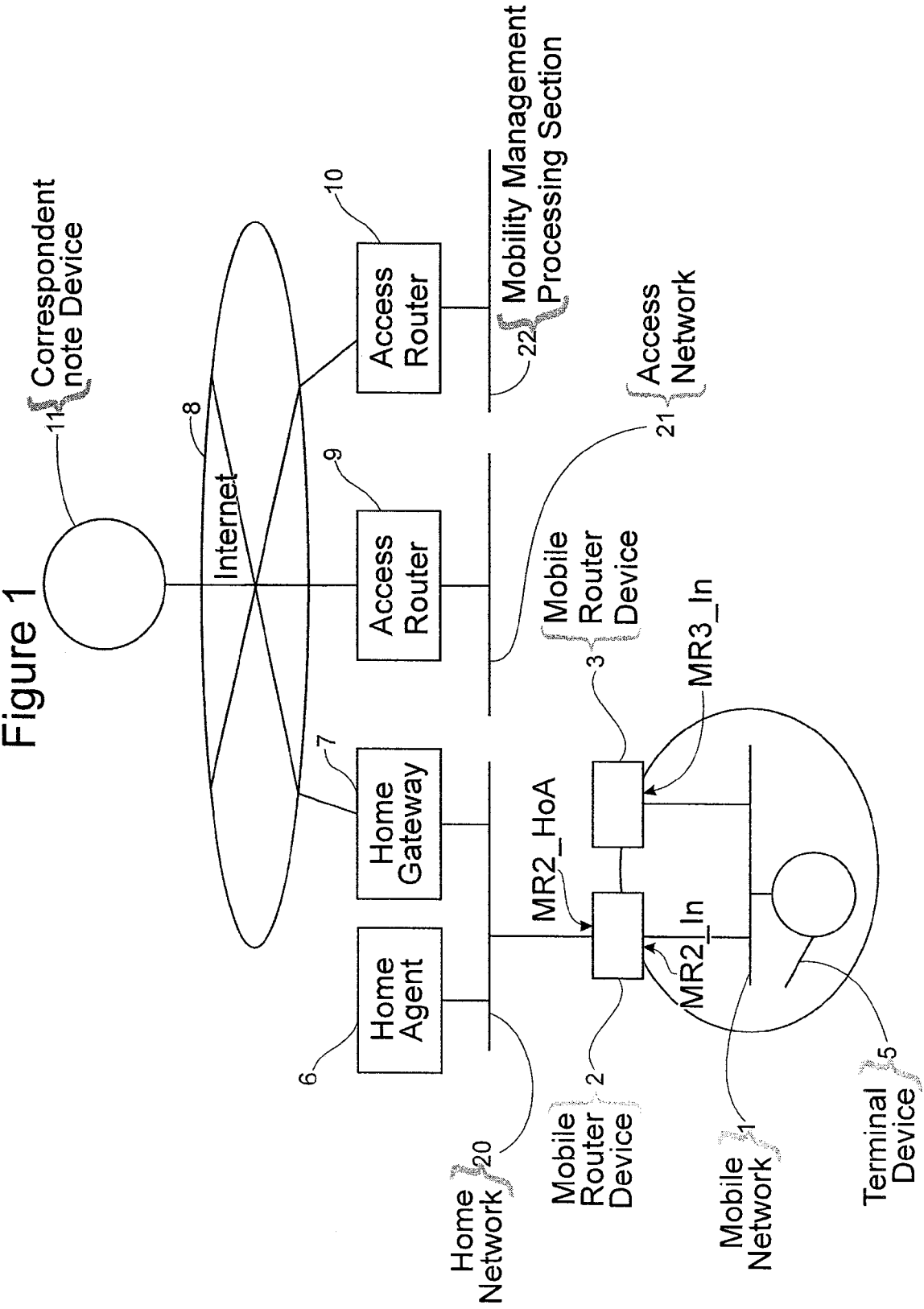
FIG. 1 shows a diagram illustrating a network system in accordance with a first exemplary embodiment of the present invention.

FIG. 1 shows a diagram illustrating a mobile network system in accordance with the first exemplary embodiment of the present invention. In FIG. 1, mobile network 1 connected to home network 20 is connected to the Internet 8 (backbone network) via home gateway 7. Mobile network 1 includes mobile router devices MR2, MR3 (sometimes referred to as mobile routers 2, 3), and terminal device LFN5. Mobile router devices MR2 and MR3 have the same physical interfaces with each other or different physical interfaces from each other at their sides to backbone network 8.

Those interfaces can adopt Ethernet method, IEEE802.11 (a, b, e, g, etc.) method, HIPERLAN method, IMT-2000 method, PDC method, GPRS method, or PHS method. Interfaces at their sides to the mobile network can adopt Ethernet method, Bluetooth method, Ultra Wide Band (UWB) method, or IEEE802.11 (a, b, e, g, etc.).

In the case of an instance shown in FIG. 1, mobile network 1 is connected to home network 20 via mobile router device MR2, and mobile router device MR3 is connected to mobile network 1 with the physical interface to the mobile network but the physical interface to the backbone network is left open. The physical interface to the backbone network 8 of mobile router device MR2 has an address of MR2_HoA, and the physical interface to mobile network 1 has an address of MR2_In while the physical interface to mobile network 1 of MR3 has an address of MR3_In.

Figure 12:
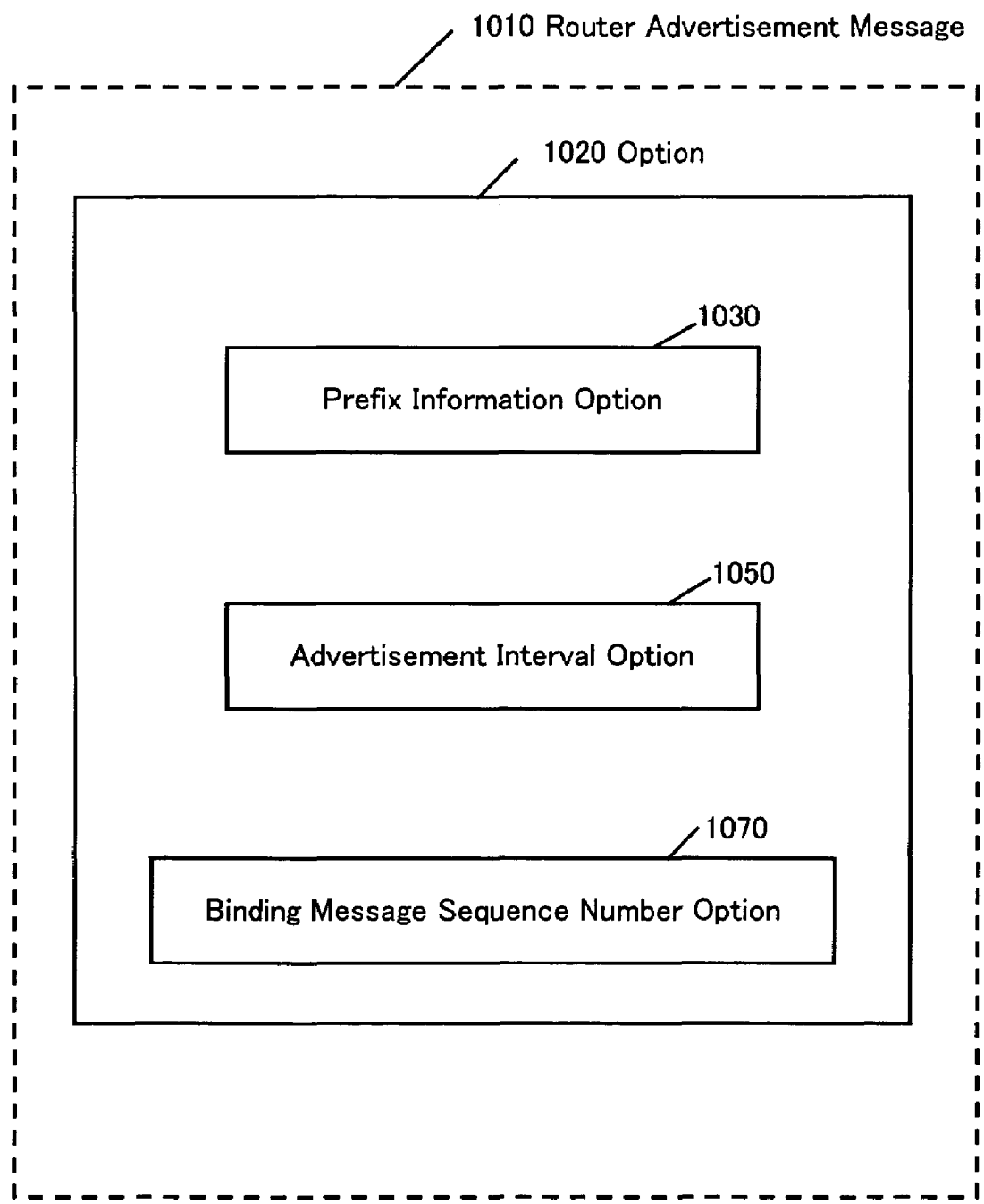
FIG. 12 shows a structure of a router advertisement message in accordance with the first and the second exemplary embodiments of the present invention.
Figure 13A:
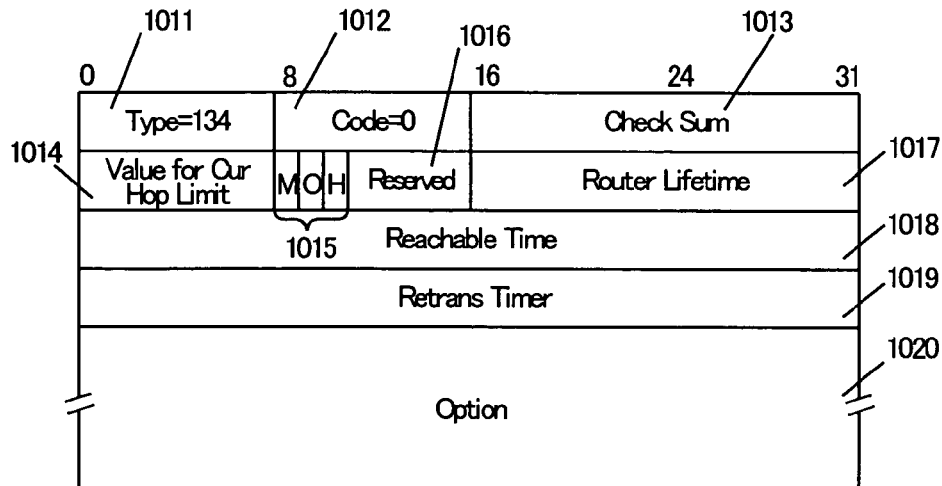
FIG. 13A shows a format of the router advertisement message in accordance with the first and the second exemplary embodiments of the present invention.
Figure 13B:
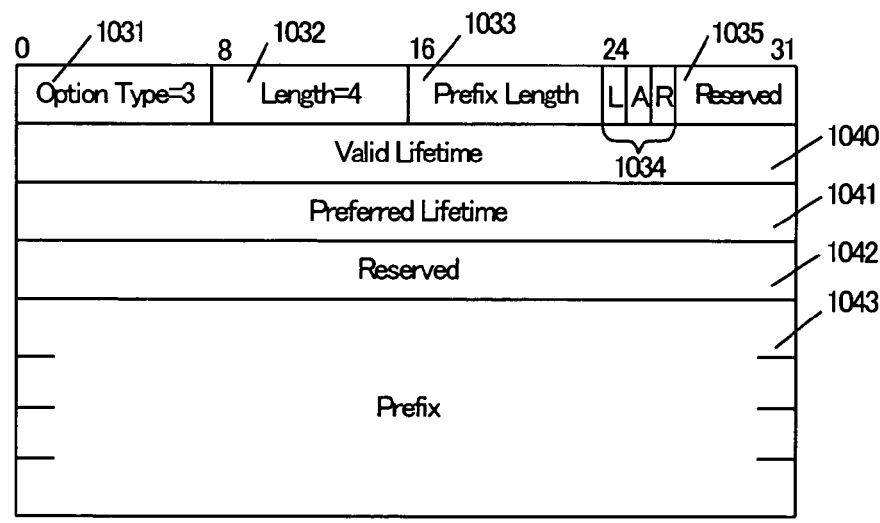
FIG. 13B shows a format of a prefix information option in the router advertisement message in accordance with the first and the second exemplary embodiments of the present invention.
Figure 13C:
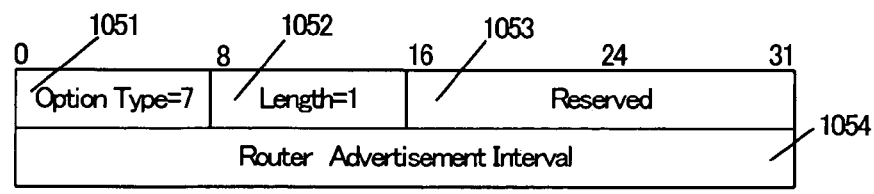
FIG. 13C shows a format of an advertisement interval option in the router advertisement message in accordance with the first and the second exemplary embodiments of the present invention.
Figure 13D:
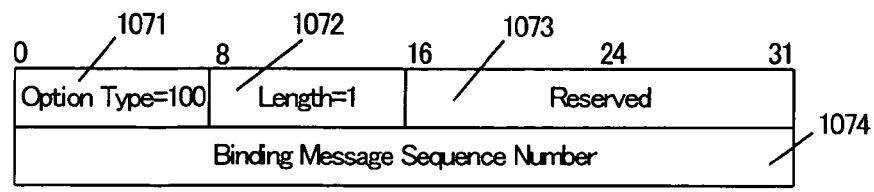
FIG. 13D shows a format of a sequence number of a binding message in the router advertisement message in accordance with the first and the second exemplary embodiments of the present invention.

Mobile router device MR2, which connecting home network 20 to mobile network 1, transmits router advertisement message 1010 shown in FIG. 13A to mobile network 1. Meanwhile, option field 1020 of this router advertisement message 1010 includes, as shown in FIG. 12, prefix information option 1030 shown in FIG. 13B. Thus the default router address of terminal device LFN5 is MR2_In corresponding to router MR2, and home gateway HGW7 transmits the packet to MR2_HoA before the packet reaches to mobile network 1.

When a correspondent node device CN11 with which a terminal device or mobile router device is communicating transmits a packet addressed to terminal device LFN5, the packet transmitted arrives at home gateway HGW7 based on the route information in the Internet 8. Home gateway HGW7 transmits the packet addressed to mobile network 1 to address MR2_HoA. Mobile router device MR2 then forwards the packet addressed to terminal device LFN5 to network 1, then the packet arrives at terminal device LFN5.

On the other hand, terminal device LFN5 transmits a packet to correspondent node device CN11 this way: Terminal device LFN5 transmits a packet addressed to correspondent node device CN11 to address MR2_In of a default router, namely, mobile router device MR2. Device MR2 receives the packet and determines whether or not the destination of the packet belongs to home network 20. Since correspondent node device CN11 does not attach to home network 20, MR2 then forwards the packet to home gateway HGW7, which then forwards the packet to the Internet 8 because the destination of the packet does not belong to its own home network 20. The packet then transmitted to correspondent node device CN11 via the Internet 8.

Figure 2:
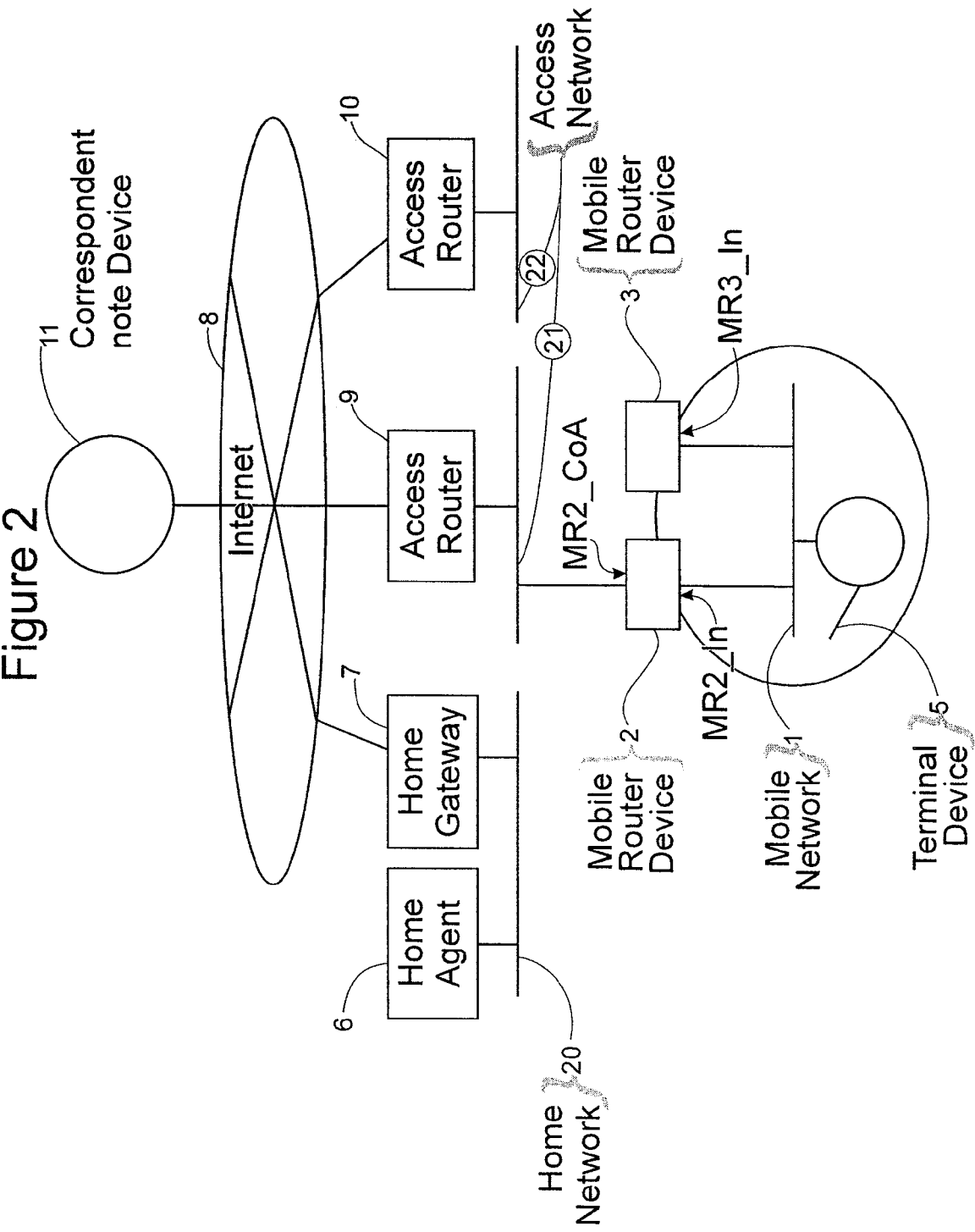
FIG. 2 shows a diagram illustrating a case where a mobile network leaves its home network in the network system in accordance with the first exemplary embodiment of the present invention.
Figure 11:
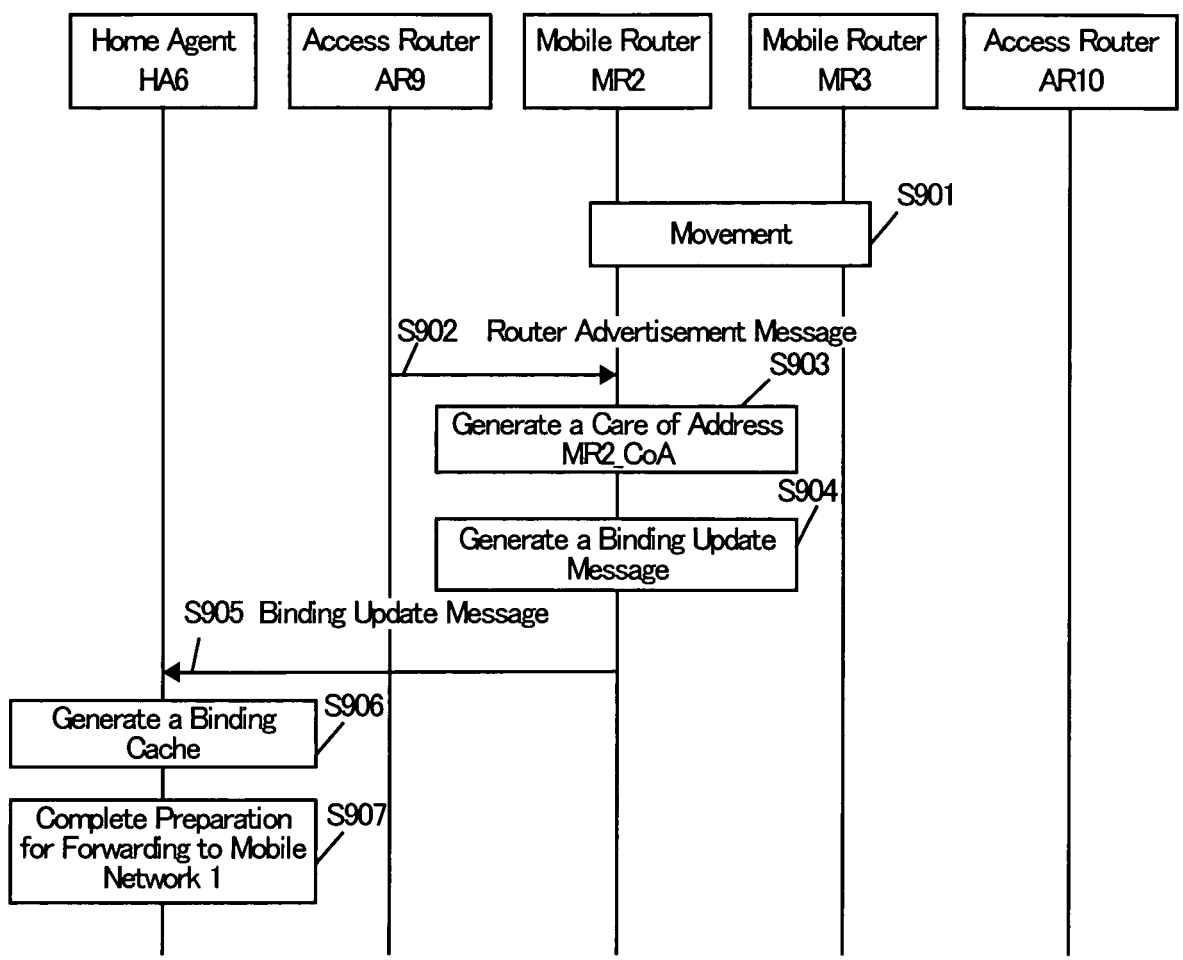
FIG. 11 shows a sequence diagram illustrating a mobility management method in accordance with the first exemplary embodiment of the present invention.

A connecting point to the Internet 8 is changed because mobile network 1 moves. A mobility management method in this case is demonstrated with reference to FIG. 2 and FIG. 11. As shown in FIG. 2, mobile network 1 leaves home network 20 and attaches to access router AR9 of which physical link is common to mobile router device MR2 as the physical interface to the backbone network (S901). At this time, MR2 receives a router advertisement message transmitted from access router AR9 (S902). Router MR2 generates care of address MR2_CoA to be temporarily used under router AR9 by using the prefix information contained in the router advertisement message (S903).

FIG. 13A-FIG. 13D show a format of router advertisement message 1010. Option field 1020 of router advertisement message 1010 shown in FIG. 13A includes prefix information option 1030 shown in FIG. 13B and advertisement interval option 1050 shown in FIG. 13C.

Next, mobile router device MR2 generates binding update message 600 that stores home address MR2_HoA 603 and care of address MR2_CoA 634 shown in FIG. 6 and FIGS. 7A-7D (S904), then transmits message 600 to home agent HA6 (S905). After this, device MR2 registers its care of address MR2_CoA as a primary care of address with home agent HA6 on home network 20 of mobile network 1.

Figure 14:
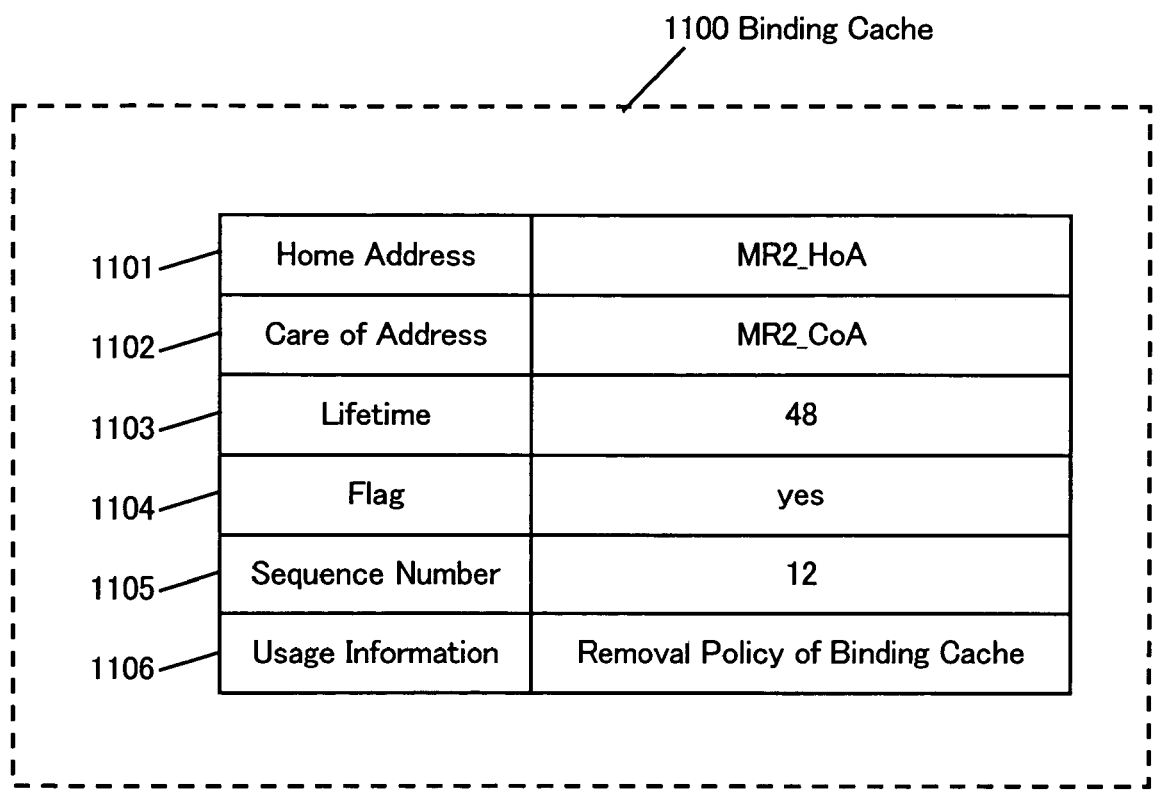
FIG. 14 shows a structure of a binding cache in accordance with the first exemplary embodiment of the present invention.

Home agent HA6 receives binding update message 600, then generates binding cache 1100 which associates home address MR2_HoA with care of address MR2_CoA (S906). This completes the preparation for forwarding or redirecting a packet to mobile network 1 after the movement of mobile network 1 from home network 20 (S907). FIG. 14 shows an instance of binding cache 1100 with which home address 1101, care of address 1102, lifetime 1103, flag 1104, sequence number 1105, and usage information 1106 are associated with each other and registered.

Mobile router device MR2 further generates a router advertisement message including binding message sequence number option 1070 in option field 1020 of router advertisement message 1010 in addition to prefix information option 1030, then transmits the message to mobile network 1. A mobile router device attaching to mobile network 1 receives router advertisement message 1010 including binding message sequence number option 1070, then records the sequence number.

The packet addressed to terminal device LFN5 and transmitted from correspondent node device CN11 arrives at home gateway HGW7 based on the route information in the Internet 8. Home gateway HGW7 transfers the packet addressed to mobile network 1 to address MR2_HoA.

However, since home agent HA6 includes binding cache 1100 of MR2_HoA and care of address MR2_CoA, home agent HA6 intercepts the packet, and encapsulates the packet addressed to terminal device LFN5, then forwards the capsule to care of address MR2_CoA of mobile router device MR2. The packet encapsulated is delivered to mobile router MR2 via access router AR9, and decapsulated by MR2 before the packet is forwarded to terminal device LFN5.

On the other hand, terminal device LFN5 transmits a packet to correspondent node device CN11 this way: Terminal device LFN5 transmits a packet addressed to correspondent node device CN11 to address MR2_In of a default router, namely, mobile router device MR2. Device MR2 receives the packet addressed to CN11, then encapsulates the packet and forwards the capsule to home agent HA6.

The packet encapsulated is delivered to home agent HA6 via access router AR9, then decapsulated by home agent HA6. An examination of the packet address finds that the address does not belong to home network 20, so that the packet is forwarded to correspondent node device CN11 via the Internet 8.

Figure 3:
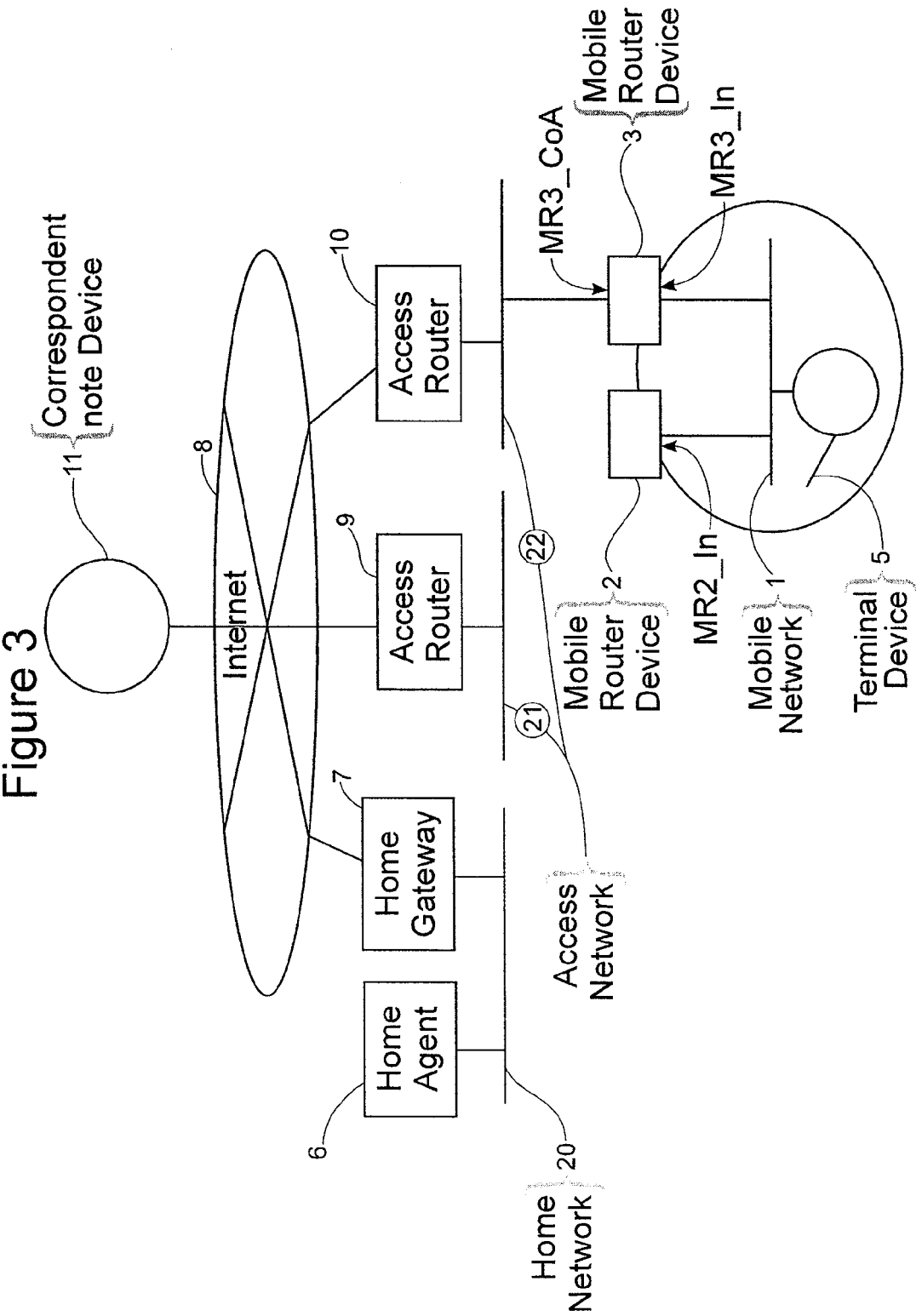
FIG. 3 shows a diagram illustrating a case where a mobile router device, which connects the mobile network to the Internet, is switched over to another one in the network system in accordance with the first exemplary embodiment of the present invention.
Figure 15:
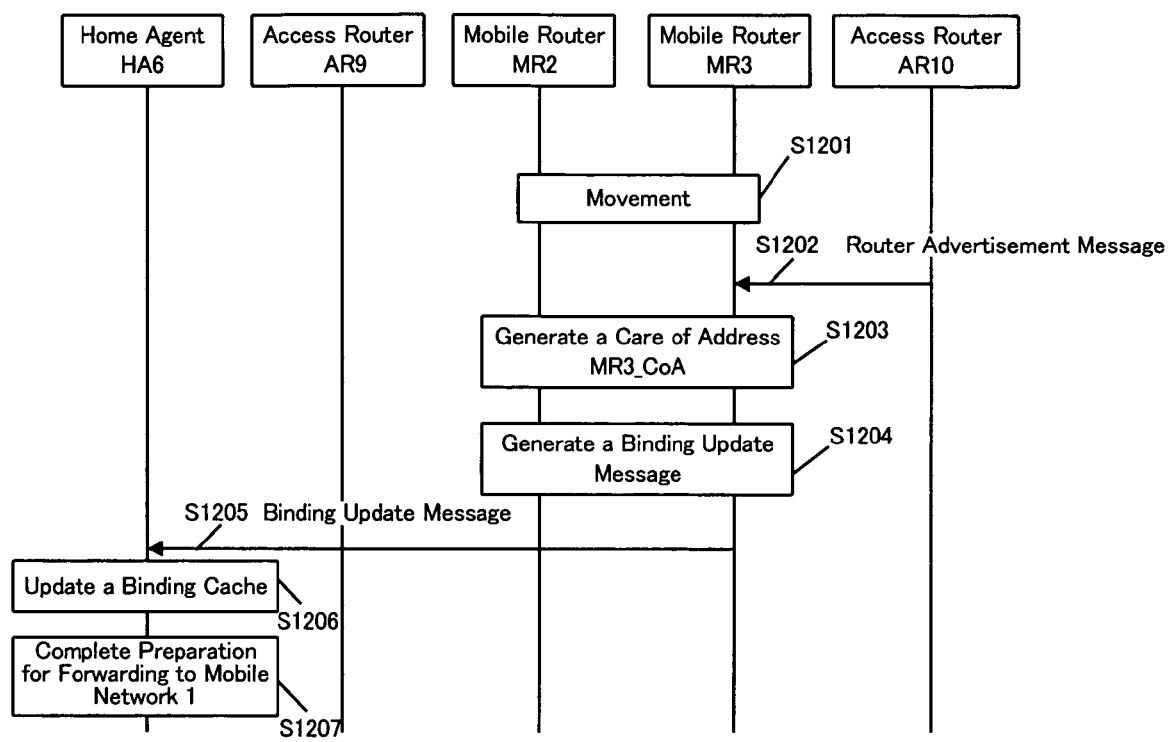
FIG. 15 shows a sequence diagram illustrating a mobility management method in accordance with the first exemplary embodiment of the present invention.

Next, when mobile router device MR2 cannot find a usable access link but mobile router device MR3 finds the usable access link, what kind of mobility management method is taken is demonstrated hereinafter with reference to FIG. 3 and FIG. 15. As shown in FIG. 3, it is assumed that mobile network 1 leaves home network 20 or access network 21, and enters under access router AR 10 having a physical link as same as the physical interface to the backbone network interface of mobile router device MR3 (S1201).

At this time, after mobile router device MR2 has received router advertisement message 1010 transmitted from access router AR9, if router MR2 cannot receive the next router advertisement message 1010 in a time substantially longer than router advertisement interval 1054 (e.g. advertisement interval×3) included in router advertisement message 1010, router MR2 determines that the connection to access router AR9 is lost.

Mobile router device MR3 receives router advertisement message 1010 transmitted from access router AR10 (S1202). Router MR3 obtains prefix information 1043 from router advertisement message 1010, and generates care of address MR3_CoA to be temporarily used under access router AR10 (S1203).

Next, mobile router device MR3 detects the halt of periodical transmission of router advertisement message 1010 from router MR2. After mobile router MR3 has received the updated router advertisement message 1010 transmitted from router MR2, if router MR3 cannot receive the next router advertisement message 1010 in a time substantially longer than router advertisement interval 1054 (e.g. advertisement interval×3) included in router advertisement message 1010, router MR3 determines that the periodical transmission of router advertisement message 1010 is halted.

At this time, as shown in FIG. 8 and FIG. 9A-FIG. 9D, not the home address of router MR3 but home address MR2_HoA of router MR2 having worked as the master router between mobile network 1 and home network 20 is used as home address 603 of binding update message, and care of address MR3_CoA is used as care of address 734 in binding update message 700.

Router MR3 generates binding update message 700 including sequence number 621 which contains 1+the sequence number of sequence number option 1070, which sequence number has been notified by router MR2 with binding message sequence number option 1070 of router advertisement message 1010. Router MR3 then transmits this binding update message 700 to home agent HA6 (S1205), thereby registering its care of address MR3_CoA as a primary care of address with home agent HA6 on home network 20 of mobile network 1.

Figure 16:
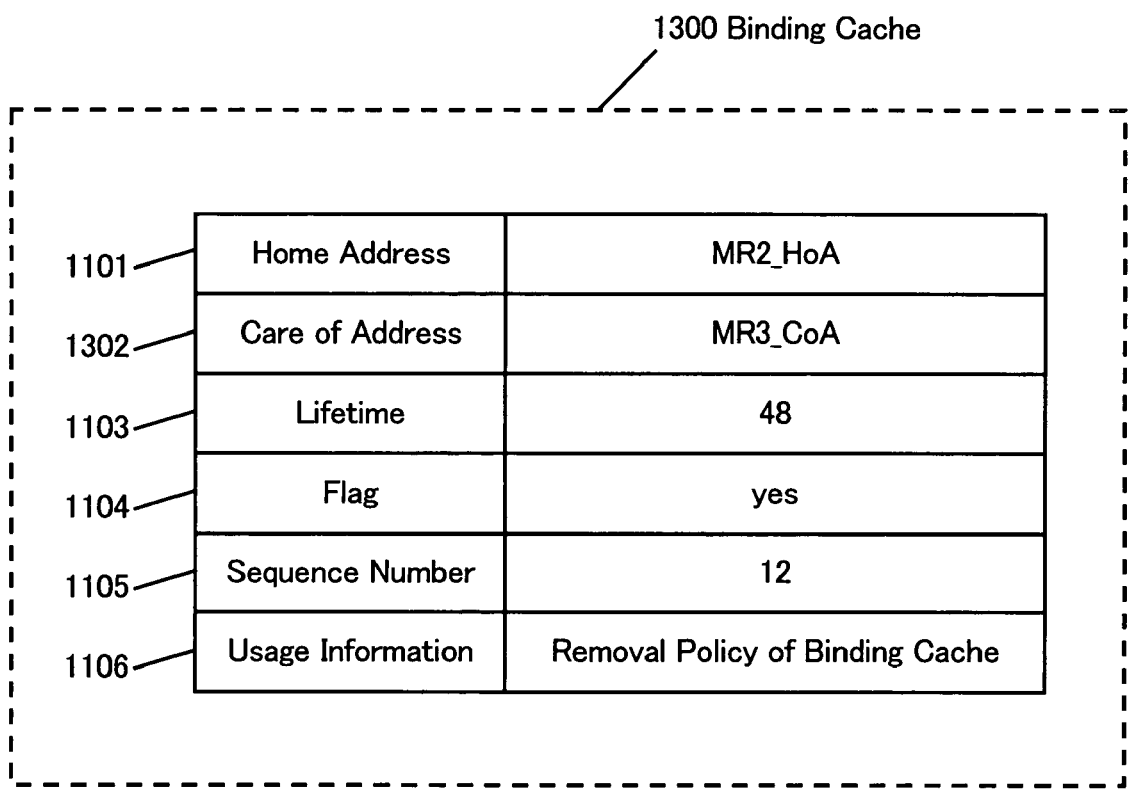
FIG. 16 shows a structure of a binding cache in accordance with the first exemplary embodiment of the present invention.

Home agent HA6 receives binding update message 700, then generates binding cache 1300 for associating home address MR2_HoA with care of address MR3_CoA (S1206). This completes the preparation for forwarding or redirecting a packet to mobile network 1 after the movement of mobile network 1 from home network 20 (S1207). FIG. 16 shows an instance of binding cache 1300 with which home address 1101, care of address 1302, lifetime 1103, flag 1104, sequence number 1105, and usage information 1106 are associated with each other and registered.

Mobile router device MR2 has lost the connection to an external network, then halts the transmission of router advertisement message 1010 to mobile network 1, and router MR3 taking over the function of router MR2 starts transmitting router advertisement message 1010 to the mobile network. Thus after the lapse of valid lifetime 1040 included in the last router advertisement message 1010 transmitted from router MR2, the default router of terminal device LFN5 is assigned to address MR3_In.

The packet transmitted by correspondent node device CN11 and addressed to terminal device LFN5 arrives at home gateway HGW7 based on the route information in the Internet 8. Home gateway HGW7 forwards the packet addressed to mobile network 1 to address MR2_HoA.

However, since home agent HA6 includes binding cache 1300 of MR2_HoA and care of address MR3_CoA, home agent HA6 intercepts the packet, and encapsulates the packet addressed to terminal device LFN5, then forwards to care of address MR3_CoA of mobile router device MR3. The packet encapsulated is delivered to mobile router MR3 via access router AR10, and decapsulated by MR3 before the packet is forwarded to terminal device LFN5.

On the other hand, terminal device LFN5 transmits a packet to correspondent node device CN11 this way: Terminal device LFN5 transmits a packet addressed to correspondent node device CN11 to address MR3_In of the default router, namely, mobile router device MR3. Router MR3 receives the packet addressed to CN11, then encapsulates the packet and forwards the capsule to home agent HA6.

The packet encapsulated is delivered to home agent HA6 via access router AR10, then decapsulated by home agent HA6. An examination of the packet address finds that the address does not belong to home network 20, so that the packet is forwarded to correspondent node device CN11 via the Internet 8.

Figure 4:
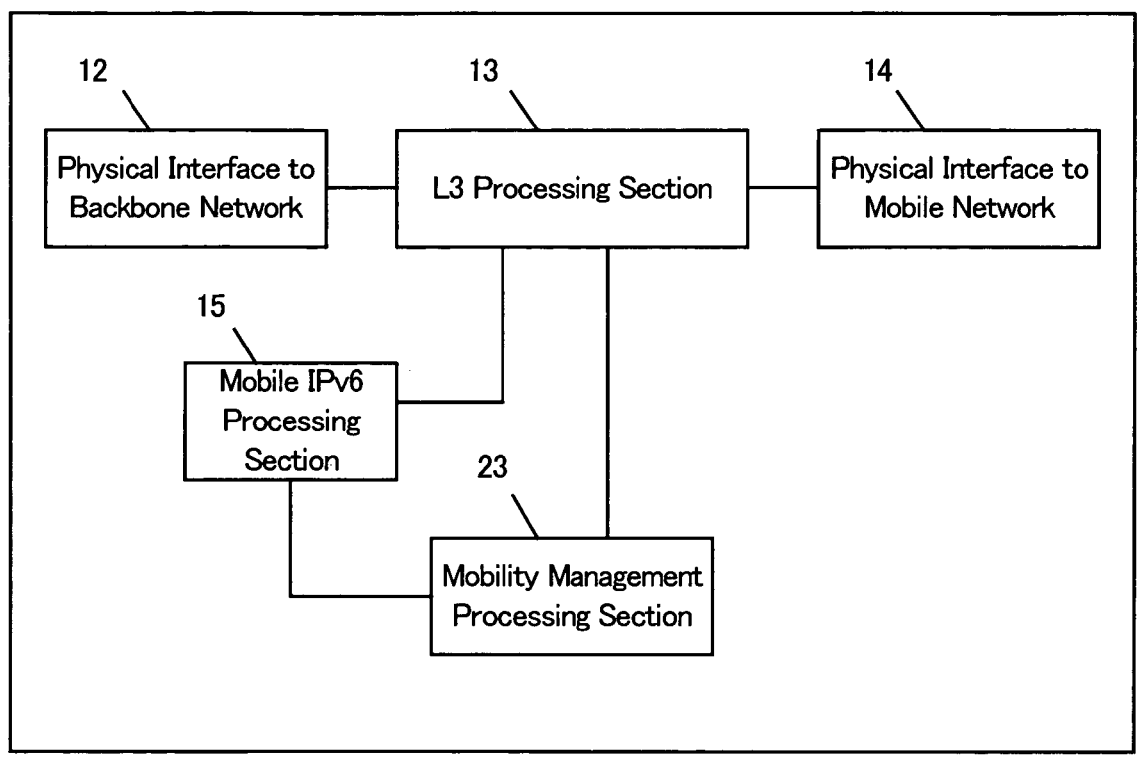
FIG. 4 shows a block diagram illustrating a structure of a mobile router device in accordance with the first exemplary embodiment of the present invention.

FIG. 4 shows a structure of mobile router devices MR2 and MR3. Each one of those routers comprises the following elements:
physical interface to a backbone network 12;
L3 processing section 13;
physical interface to a mobile network 14;
Mobile IPv6 processing section 15; and
mobility management processing section 23.

Physical interface to a backbone network 12, carries out the following processes: processes of the physical layer and the data link layer of a packet received from backbone network 8, process of transferring the packet to L3 processing section 13, and process of providing the packet, received from L3 processing section and destined to backbone network 8, with data link process and physical layer process.

Physical interface to a mobile network 14, carries out the following processes: physical layer process and data link layer process of a packet received from mobile network 1, process of transferring the packet to L3 processing section 13, and process of providing the packet, received from L3 processing section and destined to mobile network 1, with data link process and physical layer process.

L3 processing section 13 carries out the following processes: providing a packet, transferred between physical interface to the backbone network 12 or physical interface to the mobile network 14, with network layer process. On top of that, L3 processing section 13 generates router advertisement message 1010 and transmits/receives router advertisement message 1010, thereby monitoring the connection to the backbone network and determining whether or not another mobile router device in the mobile network works as a router for connecting the mobile network to the backbone network. L3 processing section 13 also communicates with Mobile IPv6 processing section 16 when Mobile IPv6 process is needed in the packet.

Mobile IPv6 processing section 15 provides the packet received from L3 processing section 13 with packet processing based on Mobile IPv6 procedure, then transfers the packet to L3 processing section 13. Mobile IPv6 processing section 15 receives a home address and a sequence number from mobility management processing section 23, and generates a packet for carrying out the mobility management of mobile network 1 based on the home address, then transfers the packet to L3 processing section 13.

Mobility management processing section 23 receives the prefix information included in the router advertisement message from L3 processing section 13, which information is received at the physical interface to the backbone network 12, and mobility management processing section 23 records the prefix information in order to detect a movement. Mobility management processing section 23 also records the home address to be used at physical interface to the backbone network 12, of a mobile router device in mobile network 1. Mobility management processing section 23 further transfers the home address and the sequence number to Mobile IPv6 processing section 15 because when a mobile router device connects to an access network while moving, mobility management processing section 23 manages the movement by using the home address.

A basic operation of mobile router device MR2 shown in FIG. 4 is demonstrated hereinafter. Router MR2 forwards a packet in the following manner, and router MR3 has a similar structure and forwards a packet in a similar way to those of router MR2.

Mobile router device MR2 monitors the status of physical interface to the backbone network 12. When router MR2 receives router advertisement message 1010 containing prefix information option 1030 and advertisement interval option 1050, router MR2 determines that physical interface to the backbone network 12 is connected to the backbone network. If router MR2 does not receive the next router advertisement message 1010 containing the same prefix 1043 even after the lapse of a predetermined time, router MR2 determines that physical interface to the backbone network 12 lost the connection to the network.

At the same time, router MR2 determines a presence of a mobile router device working as a mobile router connecting the mobile network to the backbone network. To be more specific, if router advertisement message 1010 from the mobile network is periodically transmitted by another router device, the mobile router device working as the mobile router exists in the mobile network. If not, such a mobile router device does not exist.

Router MR2 works as a router device and transmits a packet between backbone network 8 and mobile network 1 provided the following two conditions are satisfied: physical interface to the backbone network 12, is connected to the backbone network; and there is only a mobile router device that works as a mobile router which connects the mobile network to the backbone network and no other such routers exist.

When mobile router device MR2 works as a router device, router MR2 receives the packet received from backbone network 8, and the packet undergoes physical layer protocol process and data link protocol process in physical interface to backbone network 12. Then router MR2 forwards the packet to L3 processing section 13 where the packet undergoes IP process, while Mobile IPv6 processing section 15 carries out IP header process, which is an additional part as Mobile IPv6 to IPv6, according to the Mobile IPv6 procedure. After the routing process in L3 processing section 13, the packet is forwarded to one of physical interface to the backbone network 12, or physical interface to the mobile network 14.

On the other hand, a packet received from mobile network 1 undergoes the process by physical interface to mobile network 14, and is forwarded to L3 processing section 13 where the packet undergoes IP protocol process, while Mobile IPv6 processing section 15 carries out IP header process, which is redundant to Mobile IPv6, according to the Mobile IPv6 procedure. After the routing process in L3 processing section 13, the packet is forwarded to one of physical interface to the backbone network 12 or physical interface to the mobile network 14.

L3 processing section 13 generates router advertisement message 1010 in which prefix information option 1030 is stored in option field 1020, and forwards the message packet to physical interface to the mobile network 14.

When router MR2 does not work per se as a router device, router MR 2 disposes of a packet to be forwarded without any processes regarding the packet. In this case router MR2 does not produce a router advertisement message. Further, physical interface to the mobile network 14, receives a packet, which is then forwarded to L3 processing section 13, and the packet is actually router advertisement message 1010 transmitted by another mobile router device, and router advertisement message 1010 contains binding message sequence number option 1070. In such a case, router MR2 notifies mobility management processing section 23 of the sequence number, and mobility management processing section 23 retains the sequence number.

Figure 5:
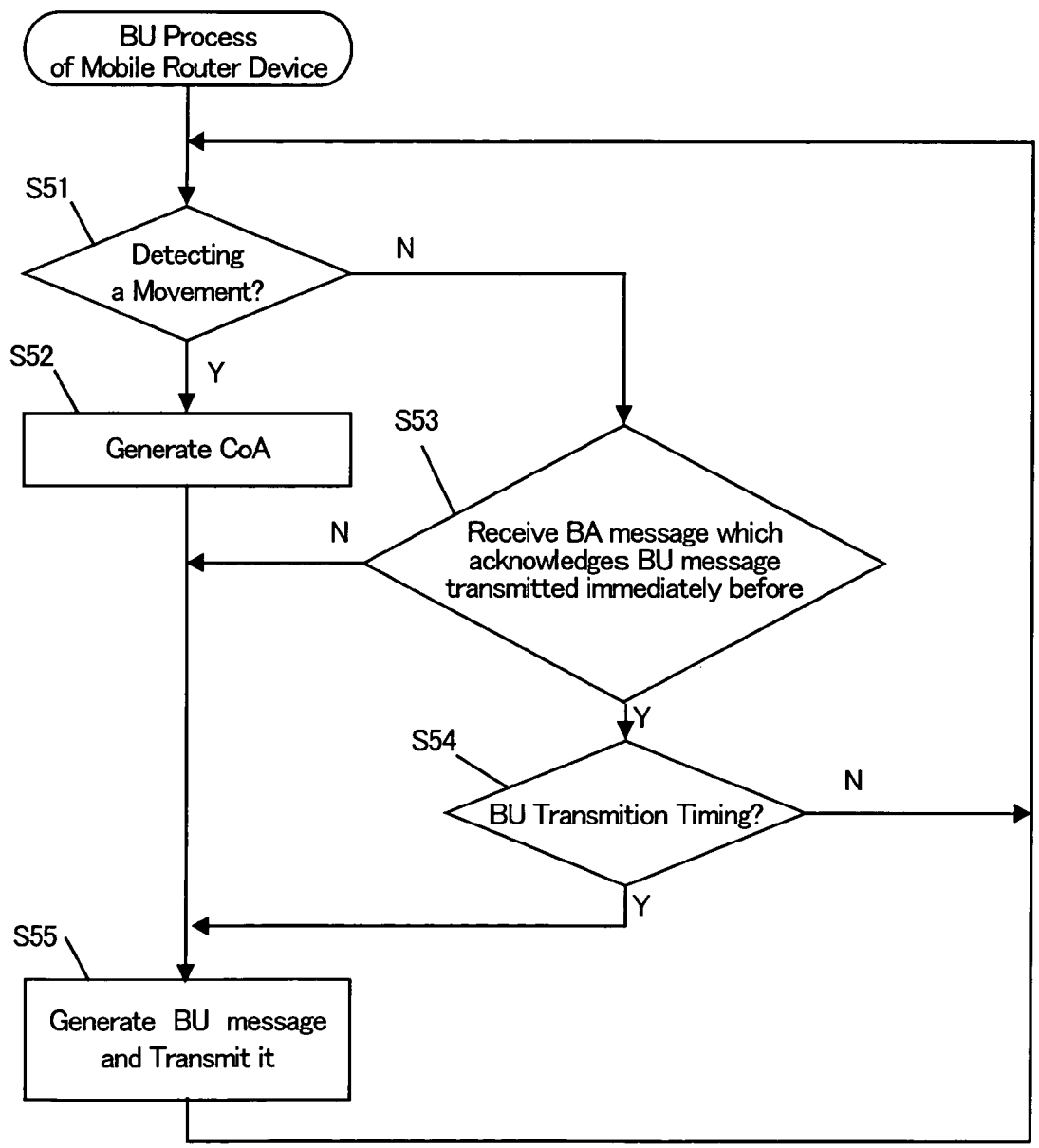
FIG. 5 shows a flowchart illustrating a process flow of updating a binding in accordance with the first exemplary embodiment of the present invention.
Figure 7A:
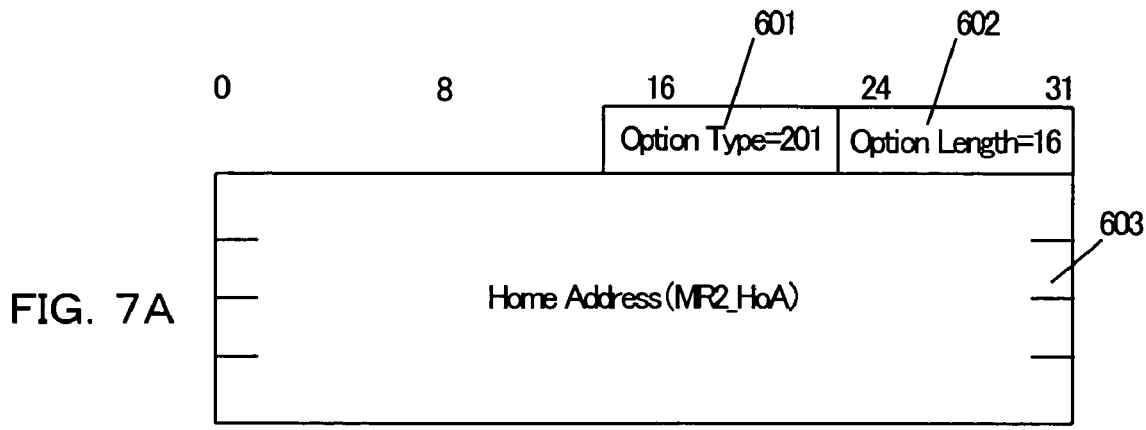
FIG. 7A shows a format of a home address option in the binding update message in accordance with the first exemplary embodiment of the present invention.
Figure 7B:
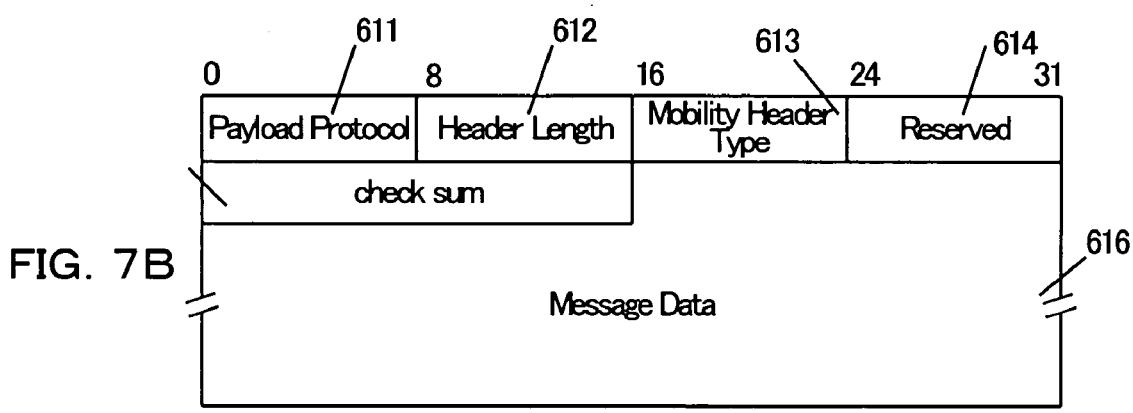
FIG. 7B shows a format of a mobility header in the binding update message in accordance with the first exemplary embodiment of the present invention.
Figure 7C:
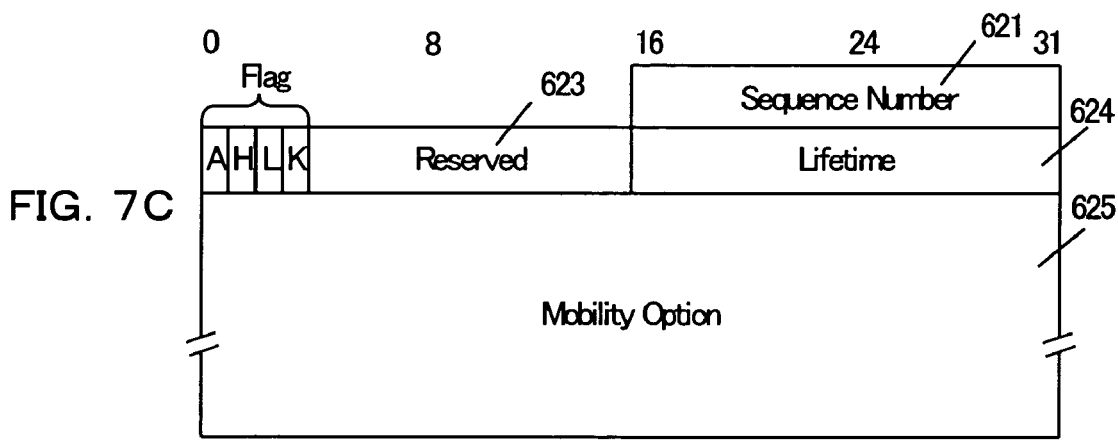
FIG. 7C shows a format of a binding update in the binding update message in accordance with the first exemplary embodiment of the present invention.
Figure 7D:
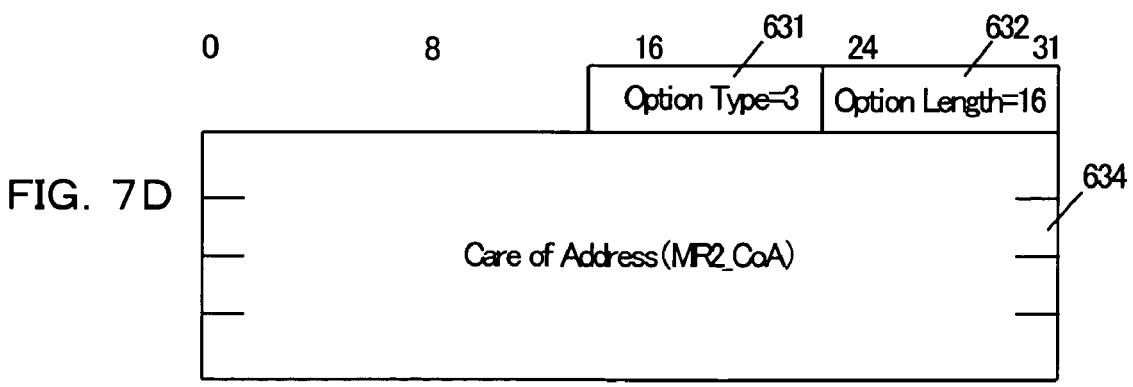
FIG. 7D shows a format of an alternate care of address mobility option in the binding update message in accordance with the first exemplary embodiment of the present invention.
Figure 8:
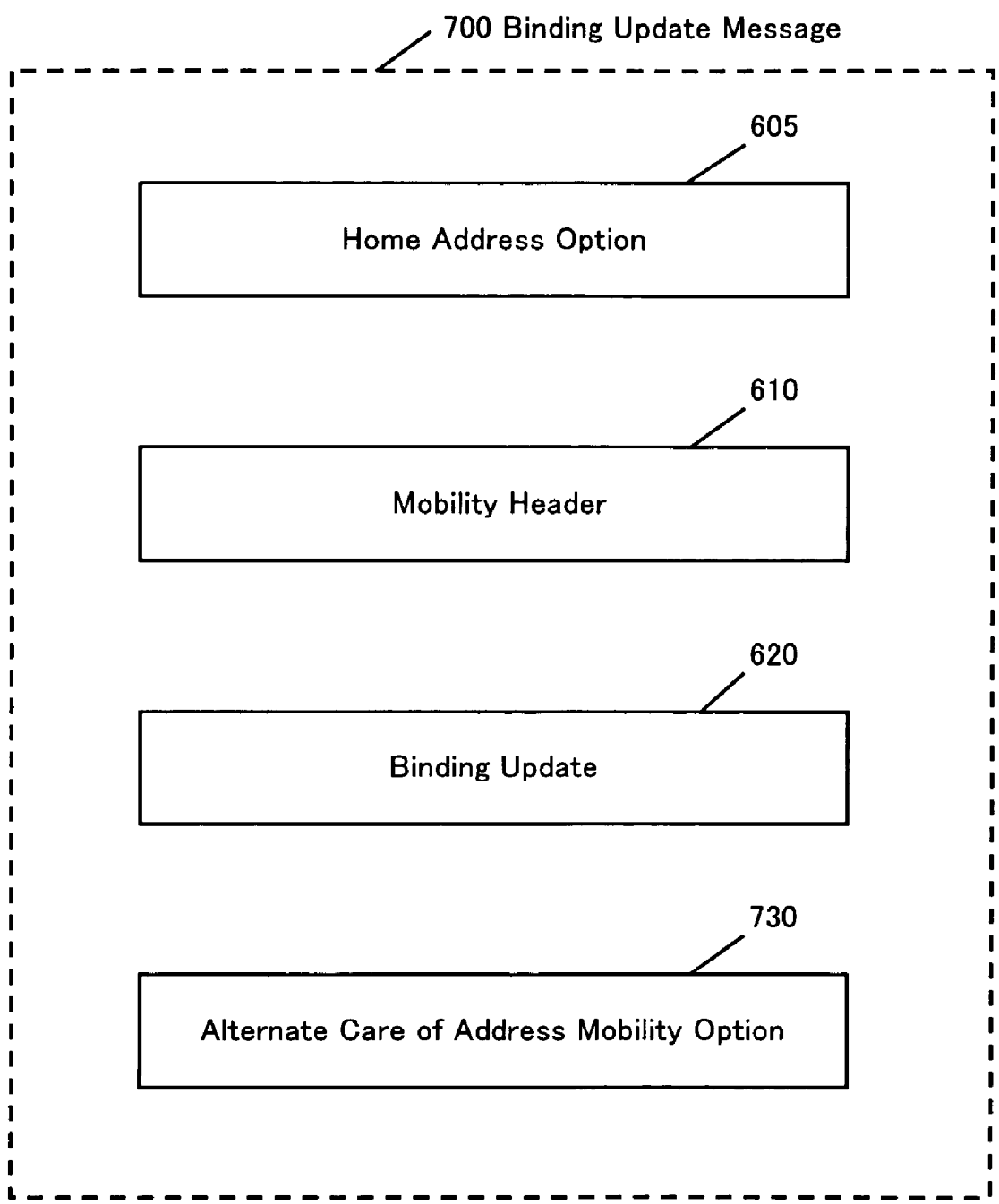
FIG. 8 shows a structure of a binding update message in accordance with the first exemplary embodiment of the present invention.
Figure 9A:
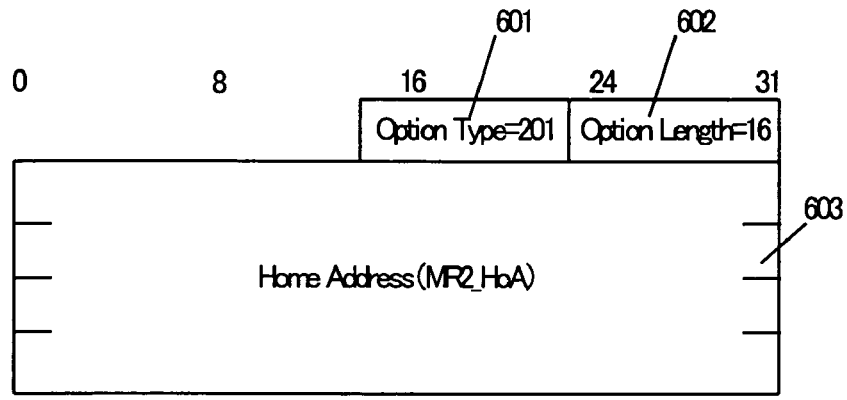
FIG. 9A shows a format of a home address option in the binding update message in accordance with the first exemplary embodiment of the present invention.
Figure 9B:
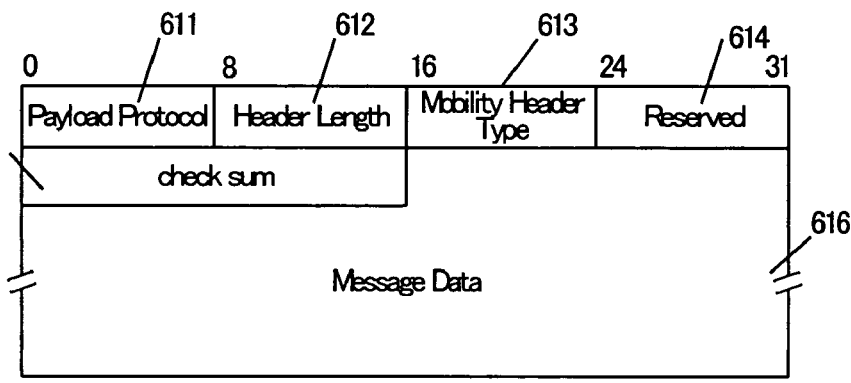
FIG. 9B shows a format of a mobility header in the binding update message in accordance with the first exemplary embodiment of the present invention.
Figure 9C:
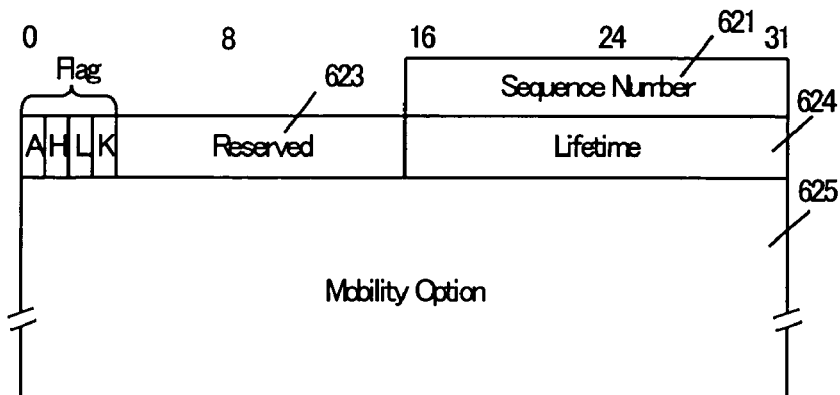
FIG. 9C shows a format of a binding update in the binding update message in accordance with the first exemplary embodiment of the present invention.
Figure 9D:
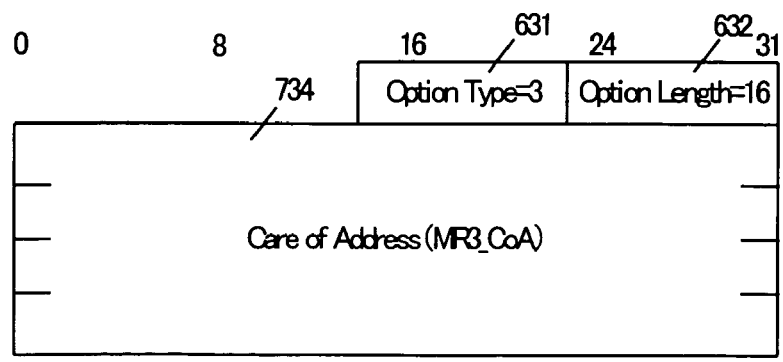
FIG. 9D shows a format of an alternate care of address mobility option in the binding update message in accordance with the first exemplary embodiment of the present invention.

FIG. 5-FIG. 7 describe how mobile router device MR2 updates the binding when mobile network 1 leaves home network 20. FIG. 5 shows a flowchart illustrating the binding update procedure of mobile router device MR2. Mobility management processing section 23 examines prefix 1043 of prefix information option 1030 contained in router advertisement message 1010 received L3 processing section 13 from physical interface to the backbone interface 12. When this examination finds prefix 1043 different from the prefix contained in the router advertisement message previously received, router MR2 detects that a connecting point to internet 8 is changed, i.e. mobile network 1 moves (S51).

Detection of the movement prompts router MR2 to generate a care of address using a virtual address and prefix information 1043 contained in router advertisement message 1010 (S52). After generation of the care of address, router MR2 determines whether or not router MR2 per se works as a router device (S55). If router MR2 works as a router device, router MR2 generates and transmits binding update message 600 shown in FIG. 6 (S56).

Binding update message 600 comprises the following elements:
home address option 605 and mobility header 610 included in extension header of IPv6 address option header;
binding update 620 included in a message data of the mobility header; and
alternate care of address mobility option 630 included in a mobility option of the binding update.

A number including 1+the sequence number retained by mobility management processing section 23 is stored in sequence number field 621 in binding update 620.

If router MR2 does not detect the movement of mobile network 1, router MR2 determines whether or not L3 processing section 13 receives a binding acknowledgement message about the binding update message transmitted immediately before (S53). This determination is then examined whether or not the determination is carried out based on the lapse of the lifetime of the binding update message transmitted immediately before (S54). In the case of router MR2 per se working as a router device (S55), router MR2 generates and transmits binding update message 600 when necessary (S56).

After the transmission of binding update message 600, mobility management processing section 23 updates its retaining sequence number to the number stored in sequence number field 621 of binding update message 600 transmitted.

In router MR2 working as a router device, when mobility management processing section 23 determines that mobile network 1 moves, mobility management processing section 23 notifies L3 processing section 13 of the sequence number stored in sequence number 621 of binding update message 600. L3 processing section 13 generates router advertisement message 1010 including prefix information option 1030 and binding message sequence number option 1070 which stores the sequence number notified to binding message sequence number 1074. Router advertisement message 1010 is then forwarded to physical interface to mobile network 14, then transmitted to mobile network 1 by physical interface to mobile network 14.

Figure 10:
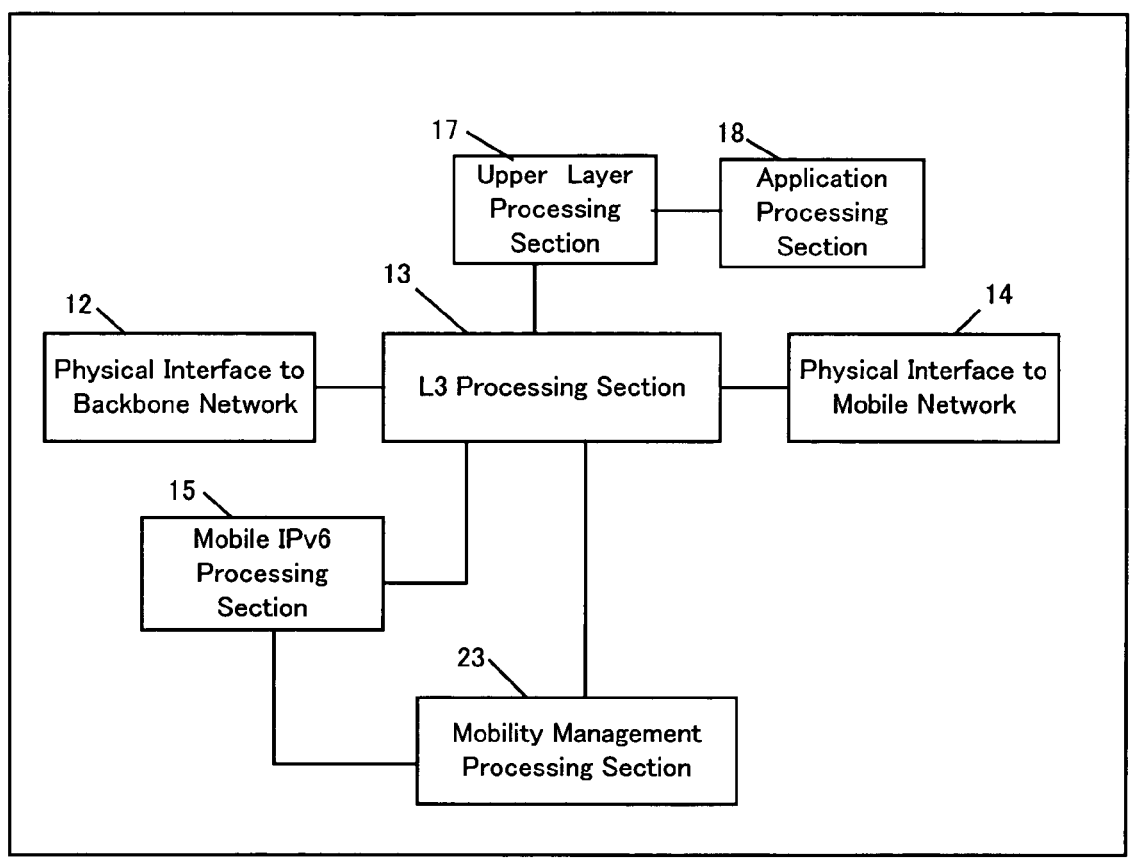
FIG. 10 shows a block diagram illustrating a structure of a mobile router device in accordance with the first exemplary embodiment of the present invention.

Router MR2 can have such functions as generating and transmitting a data packet by itself and receiving a data packet as a termination. In such a case, the structure can be what is shown in FIG. 10. This structure is similar to what is shown in FIG. 4; however, it further includes upper layer processing section 17 for carrying out upper layer process following the protocol such as TCP or UDP, and application processing section 18 for controlling an application.

A basic operation of mobile router device MR2 discussed above is demonstrated hereinafter. Router MR 2 shown in FIG. 10 starts transmission this way: A transmission data generated by application processing section 18 for transmission to the Internet 8 is forwarded to L3 processing section 13, where an IP protocol process is carried out, via upper layer processing section 17 where process is carried out following the protocol such as Sockets, TCP, or UDP. At the same time as the IP process, Mobile IPv6 processing section 15, which carries out the process according to Mobile IPv6 procedure, carries out an IP header process redundant to Mobile IPv6. The transmission data then undergoes a data link protocol process and a physical layer protocol process in physical interface to the backbone network 12. The transmission data is finally transmitted to backbone network 8.

Application processing section 18 of router MR2 generates the transmission data for the transmission to mobile network 1, the data is forwarded to L3 processing section 13, via upper layer processing section 17 where a process is carried out following the protocol such as Sockets, TCP, or UDP. The transmission data then undergoes a data link protocol process and a physical layer protocol process in physical interface to the mobile network 14. The transmission data is finally transmitted to mobile network 1.

Router MR2 receives data as a termination, and this reception operation is demonstrated hereinafter, namely, it is reverse to the transmission operation discussed above.

A packet received from backbone network 8 undergoes a physical layer protocol process and a data link protocol process in physical interface to the backbone network 12, then undergoes the IP protocol process in L3 processing section 13. During the IP protocol process, Mobile IPv6 processing section 15 carries out a redundant IP header process at the same time. Then the packet undergoes the process by upper layer processing section 17, and the packet is forwarded to application processing section 18.

After the packet received from mobile network 1 undergoes the physical layer protocol process and the data link protocol process in physical interface to the mobile network 14, the packet undergoes the IP protocol process in L3 processing section 13. Then the packet undergoes the process by upper layer processing section 17, and the packet is forwarded to application processing section 18.

Meanwhile, this embodiment uses two mobile router devices and one terminal device; however, not to mention, this embodiment can be applied to the case where a greater number of devices are used.

As discussed above, in a mobile network to which plural mobile router devices attach, one of the addresses of the plural mobile router devices is assigned as a common address to the mobile router devices' physical interface to the backbone network. A care of address corresponding to this common address is used for binding update process, so that a terminal device in the mobile network having no Mobile IPv6 can carry out communications without increasing load to the mobile network while the terminal device moves among various access networks.

In this embodiment, the mobile router device working as a router notifies another router device non-functional as a router of the sequence number used at the binding update. When the non-functional router device starts working as a router, the sequence number notified is updated. A virtual address used by the former functional router device is used for the binding update. In an environment where a mobile network includes plural mobile router devices, and a mobile router device is switched over to another one for connecting to the backbone network, the foregoing mechanism allows the home agent to manage updated movement information about mobile network without paying attention to a switch over of the mobile router device to another one. As a result, when a mobile network is provided with plural mobile router devices, the network can move without incurring increment of load.

Exemplary Embodiment 2

Figure 17:
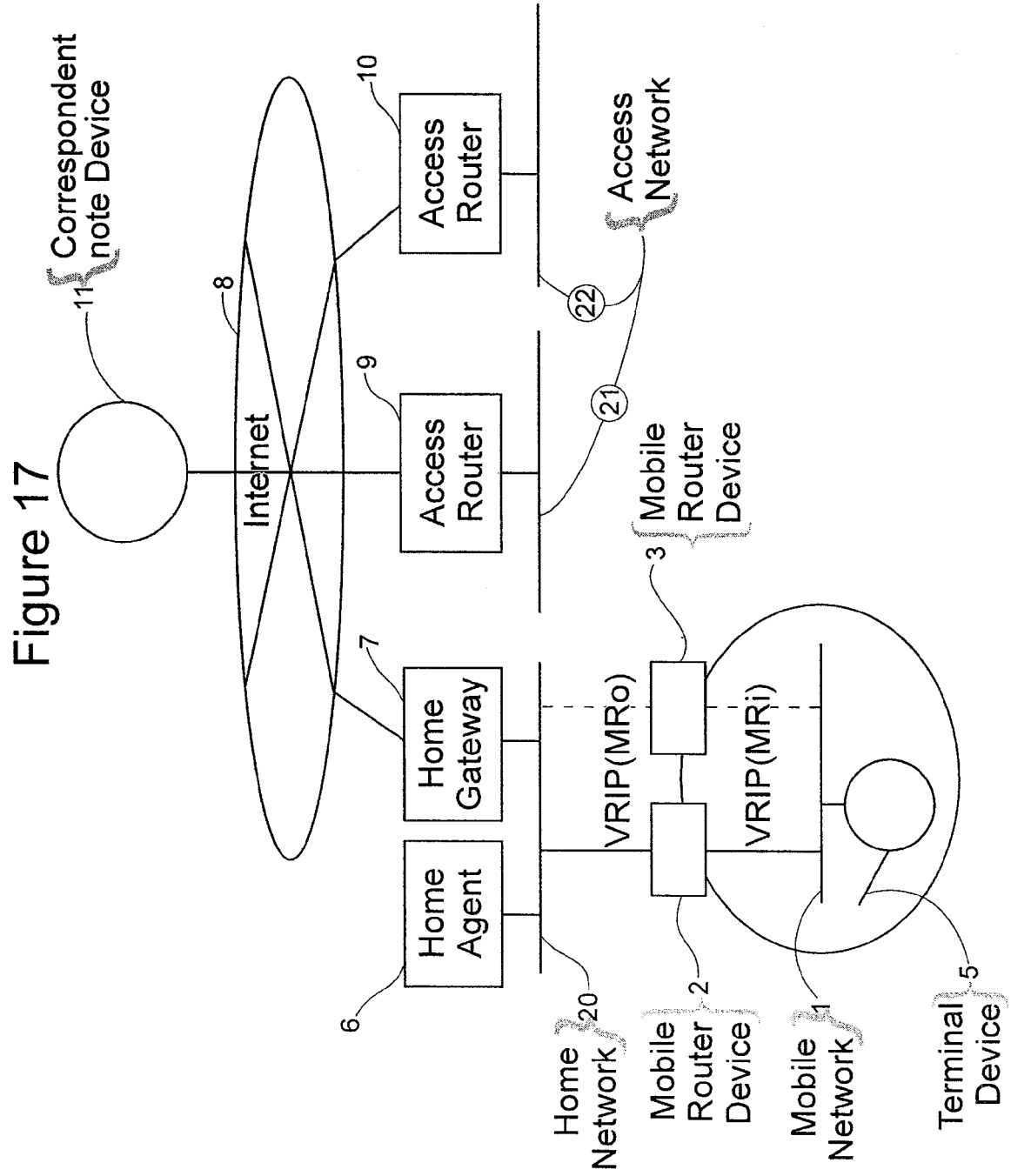
FIG. 17 shows a diagram illustrating a network system in accordance with the first exemplary embodiment of the present invention.

FIG. 17 shows a structure of a mobile network in accordance with the second exemplary embodiment of the present invention. FIG. 17 shows an example of mobile network 1 connected to home network 20. In this example, network 1 is connected to the Internet 8 (backbone network) via home gateway 7. Mobile network 1 includes mobile router devices Mr2, MR3, and terminal device LFN5. Physical interfaces to the backbone network of routers MR2 and MR3 can be the same ones or different ones.

The physical interface to backbone network 8 can adopt Ethernet method, IEEE802.11 (a, b, e, g, etc.) method, HIPERLAN method, IMT-2000 method, PDC method, GPRS method, or PHS method. Interfaces to the mobile network can adopt Ethernet method, Bluetooth method, Ultra Wide Band (UWB) method, or IEEE802.11 (a, b, e, g, etc.).

Routers MR2 and MR3 boot a virtual router redundancy protocol at the interface to mobile network 1, to be more specific, they boot VRRP (virtual router redundancy protocol) for example.

In the example shown in FIG. 17, assume that the priority of determining a relation of master router vs. backup router in router MR2 is 100, the priority of the same relation in mobile router device MR3 is 80. The relation of master router vs. backup router on the physical interface to mobile network 1 is inherited to the physical interface to the backbone network. The router working as a master router connects the backbone network to the mobile network. In this embodiment, router MR2 works as a master router, and router MR3 works as a backup router. They are shown with solid lines and dotted lines respectively in FIG. 17.

The physical interface to mobile network 1 uses VRIP (MRi) as a virtual router address, and the physical interface to backbone network to home network 20 uses VRIP (MRo) as a virtual router address. Both of them follow IPv6 address format, e.g. the address of VRIP (MRi) is 3ffe: 0501: : 5F00: 0202: 2cff: fe00: 000A, and the address of VRIP (MRo) is 3ffe: 0501: : 0100: 0202: 2cff: fe00: 0001. Therefore, a default gateway of terminal device LFN5 has an address of VRIP (MRi) and the next hop of home gateway HGW7 to mobile network 1 is VRIP (MRo).

When a packet is transmitted from correspondent node device CN11 to terminal device LFN5, the packet arrives at home gateway HGW7 based on route information in the Internet 8. Home gateway HGW7 transmits a packet addressed to mobile network 1 to VRIP (MRo). Router MR2 working as a master router forwards the packet addressed to terminal device LFN5 to mobile network 1, so that the packet is delivered to terminal device LFN5.

On the other hand, terminal device LFN5 transmits a packet to correspondent node device CN11 this way: Terminal device LFN5 transmits a packet addressed to correspondent node device CN11 to address VRIP (MRi) of the default router. Router MR2 working as the master router receives the packet addressed to CN11, then determines whether or not the address of the packet belongs to home network 20. Since correspondent node device CN11 does not attach to home network 20, the packet is forwarded to the next hop, i.e. home gateway HGW7, which then forwards the packet to the Internet 8 because the address of the packet does not belong to its home network 20. The packet is then delivered to correspondent node device CN11 via the Internet 8.

Backup router MR3 takes over the function of the master router and forwards the packet in the following cases: router MR2 becomes out of order, router MR2 cannot receive router advertisement message 1010 from an access router connected to the backbone network, or router MR2 cannot find an access link connecting to the backbone network and cannot forward the packet. In such a case, since the interface addresses stay unchanged as VRIP (MRo) and VRIP (MRi), terminal device LFN5 and home gateway HGW7 do not need any new process.

Figure 18:
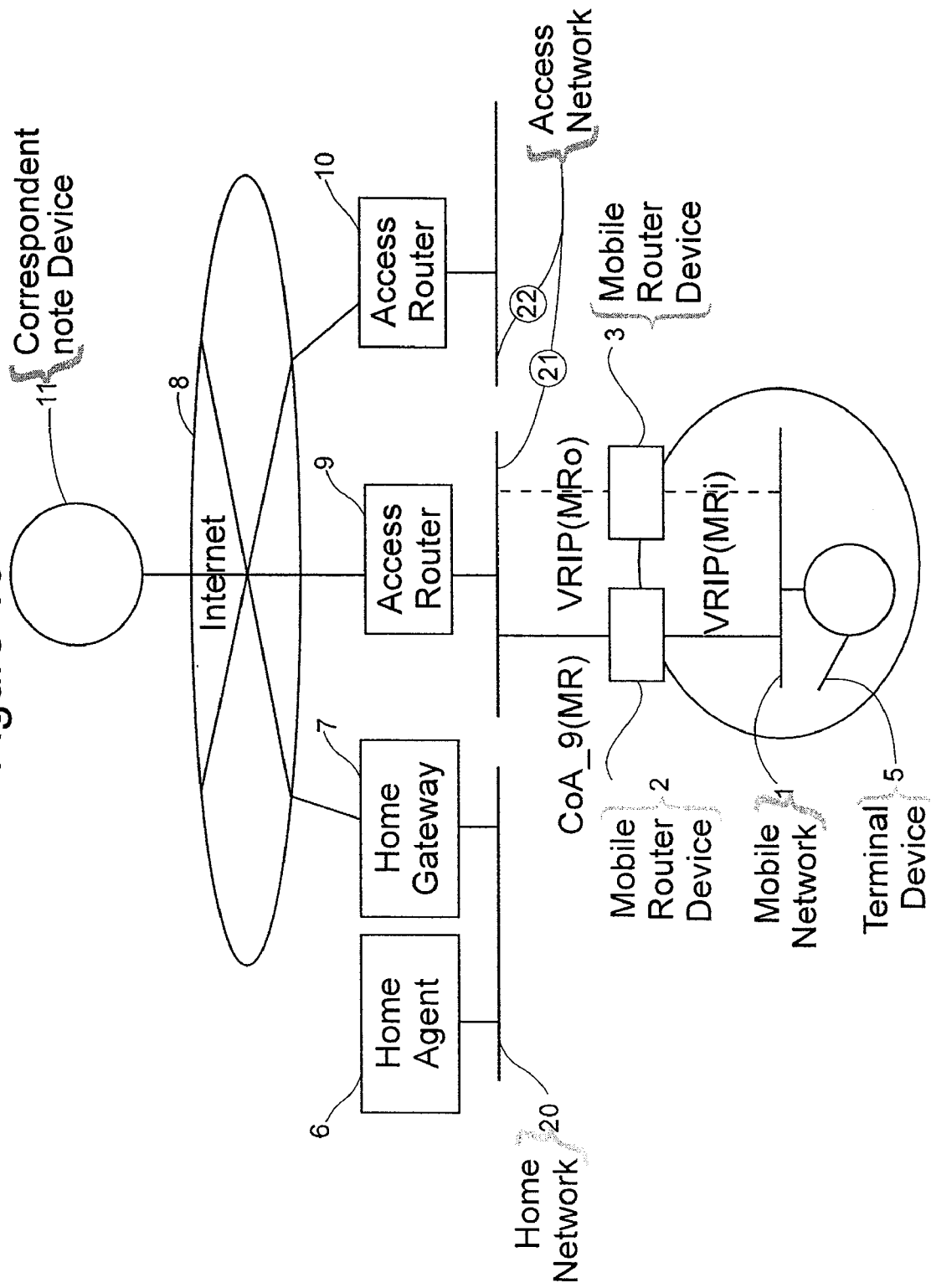
FIG. 18 shows a diagram illustrating a case where a mobile network leaves its home network in the network system in accordance with the second exemplary embodiment of the present invention.
Figure 25:
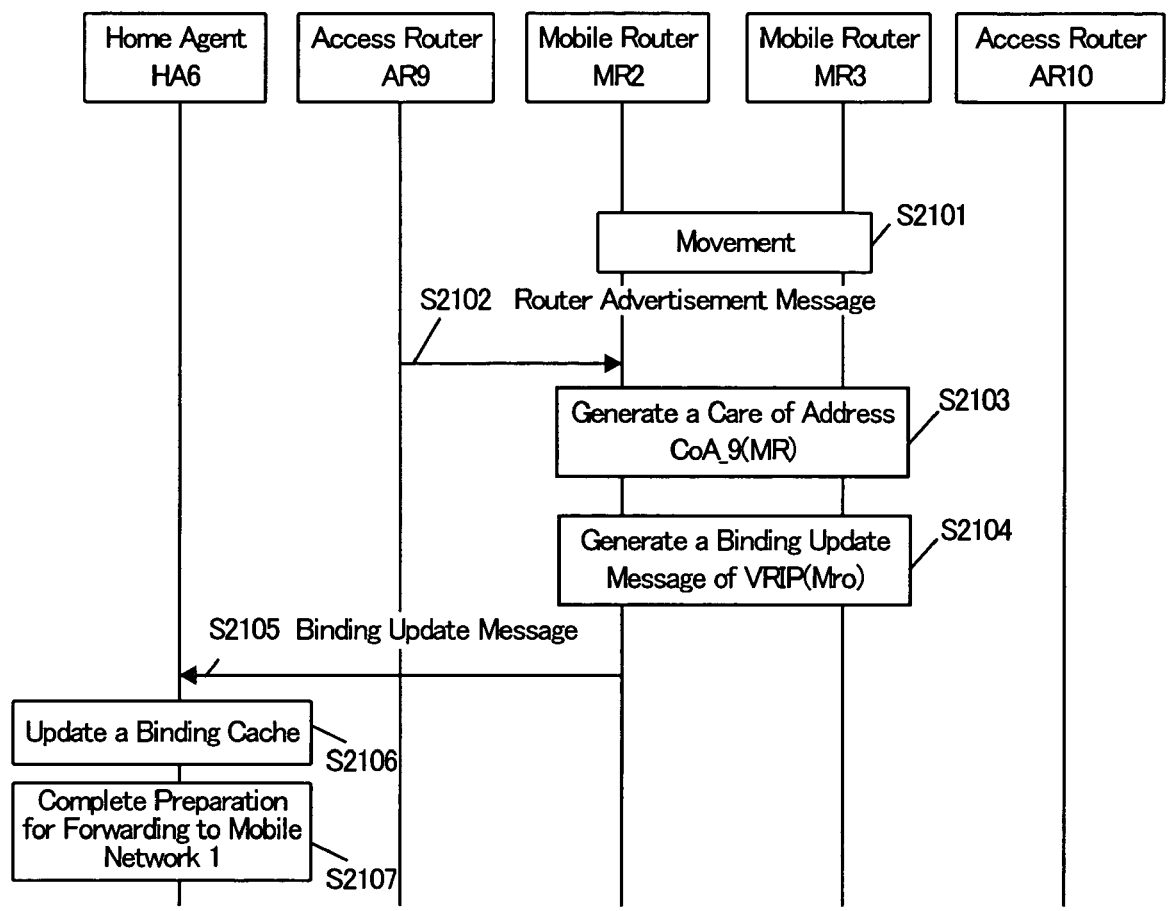
FIG. 25 shows a sequence diagram illustrating a mobility management method in accordance with the second exemplary embodiment of the present invention.

A connecting point to the Internet 8 is changed because of the movement of mobile network 1. A mobility management method in this case is demonstrated with reference to FIG. 18 and FIG. 25. As shown in FIG. 18, mobile network 1 leaves home network 20 and attaches to access router AR9 sharing the same physical link as the physical interface to backbone network with mobile router device MR2 (S2101). At this time, router MR2 receives a router advertisement message transmitted from access router AR9 (S2102). Router MR2 generates care of address CoA_9(MR) to be temporarily used under router AR9 by using the prefix information contained in the router advertisement message (S2103). This care of address can be produced, e.g. this way: the upper bits of the address use a prefix value obtained, and the lower bits use corresponding bits of the virtual address.

FIG. 12 and FIG. 13A-FIG. 13D show a format of router advertisement message 1010. Router advertisement message 1010 includes prefix information option 1030 shown in FIG. 13B and advertisement interval option 1050 shown in FIG. 12 and FIG. 13C. In this second embodiment, router advertisement message 1010 needs not include binding message sequence number option 1070 shown in FIG. 12 and FIG. 13D. Prefix information option 1030 stores prefix length 1033 and prefix information 1043.

In the case of prefix length 1033 in prefix information option 1030 being 64 bits, and prefix information 1043 being 3ffe: 0501: :1f00: 3110: 5aff: fe00: 4326, care of address CoA_9(MR) generated corresponding to the VRIP (MRo) is 3ffe: 0501: : 1f00: 0202: 2cff: fe00: 0001.

An instance of generating the care of address has been shown that the lower bits of the address to be generated use the same bits as the corresponding bits of the virtual address; however, with respect to this lower bits, another generation method can be used, e.g. using random numbers.

Since router MR2 works as the master router, it generates binding update message 1900 which stores home address VRIP (MRo) 1903, care of address CoA_9(MR) 1934 as shown in FIG. 22 and FIGS. 23A-23D (S2104), then transmits care of address CoA_9(MR) to home agent HA6 (S2105). As a result, its care of address CoA_9(MR) is registered as a primary care of address with home agent HA6 on home network 20.

Figure 26:
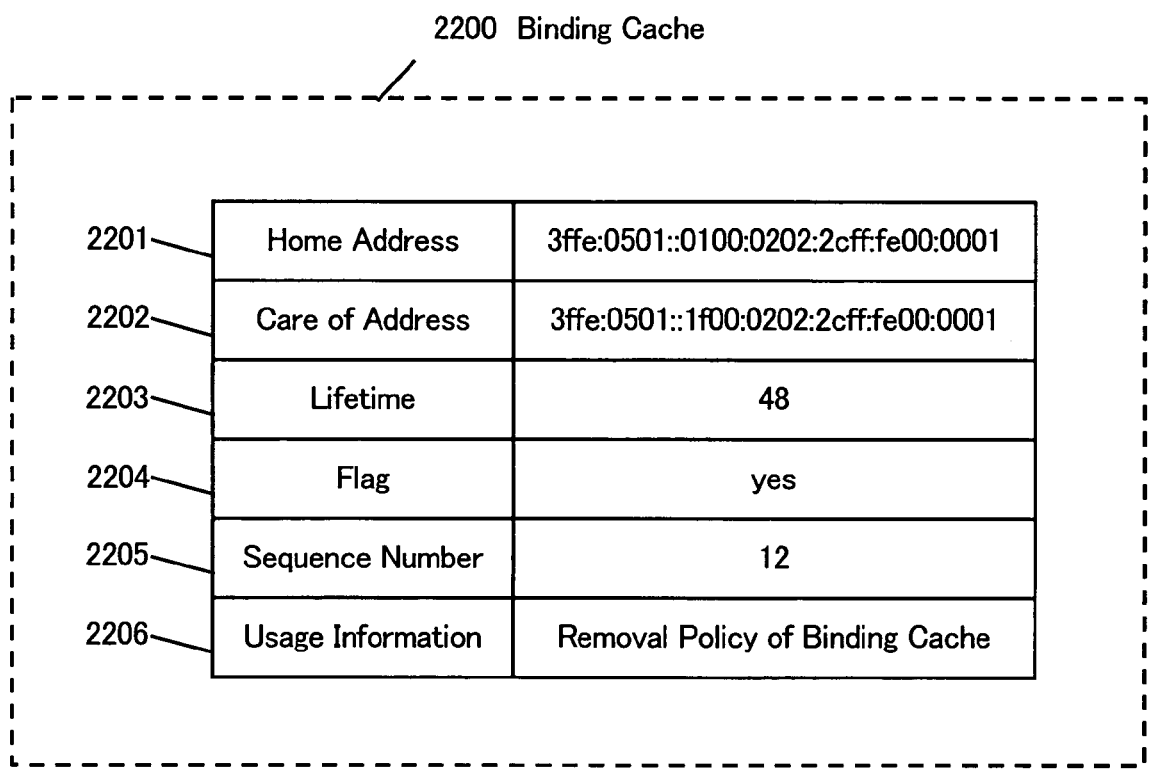
FIG. 26 shows a structure of a binding cache in accordance with the second exemplary embodiment of the present invention.

Home agent HA6 receives binding update message 1900, then generates binding cache 2200 which associates home address VRIP(MRo) with care of address CoA_9(MR) (S2106). This completes the preparation for forwarding or redirecting a packet to mobile network 1 after the movement of mobile network 1 from home network 20 (S2107). FIG. 26 shows an instance of binding cache 2200 with which home address 2201, care of address 2202, lifetime 2203, flag 2204, sequence number 2205, and usage information 2206 are associated with each other and registered.

The packet addressed to terminal device LFN5 and transmitted from correspondent node device CN11 arrives at home gateway HGW7 based on the route information in the Internet 8. Home gateway HGW7 transmits the packet addressed to mobile network 1 to address VRIP(MRo). However, since home agent HA6 includes binding cache 2200 of VRIP(MRo) and care of address CoA_9(MR), home agent HA6 intercepts the packet, and encapsulates the packet addressed to terminal device LFN5, then forwards to care of address CoA_9(MR) of mobile router device MR2. The packet encapsulated is delivered to mobile router device MR2 via access router AR9, and decapsulated by router MR2 before the packet is forwarded to terminal device LFN5.

Figure 27:
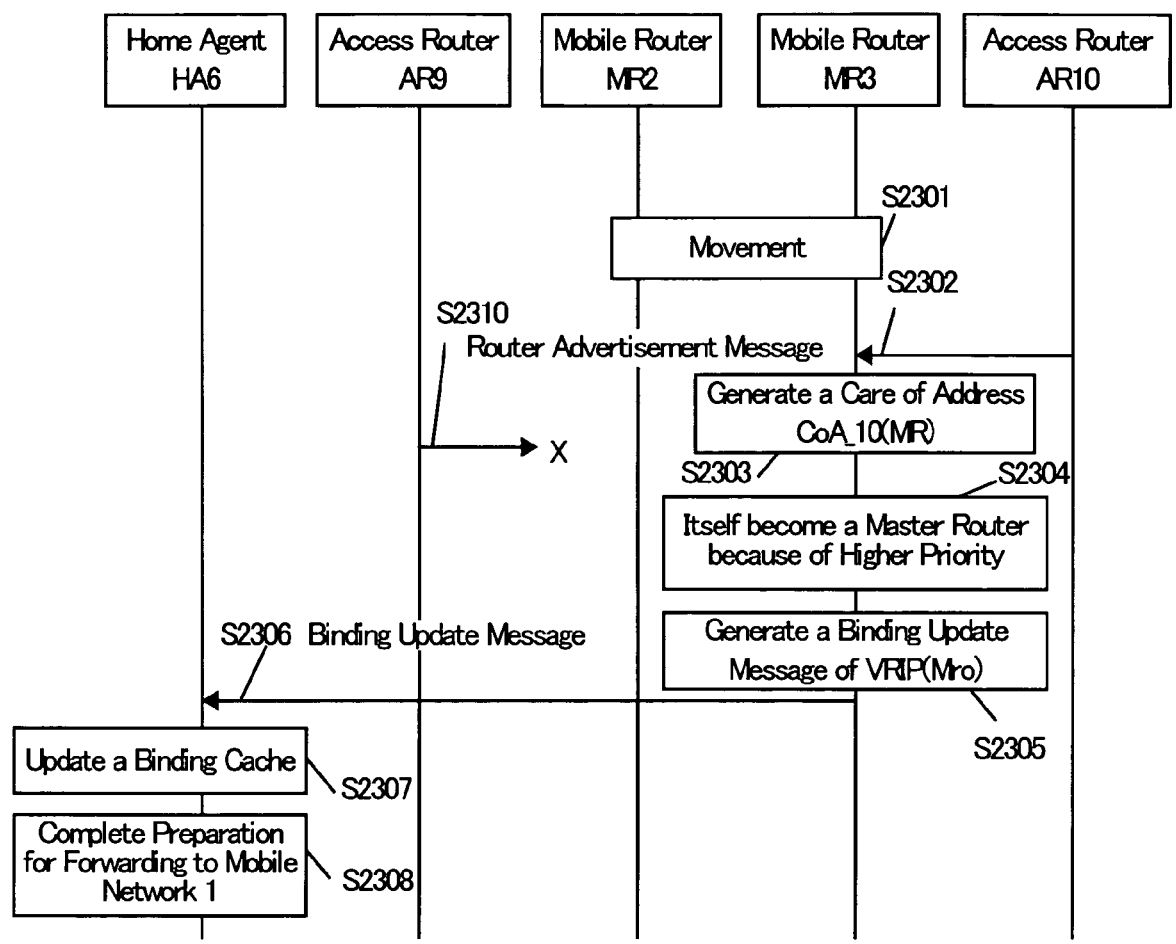
FIG. 27 shows a sequence diagram illustrating a mobility management method in accordance with the second exemplary embodiment of the present invention.
Figure 28:
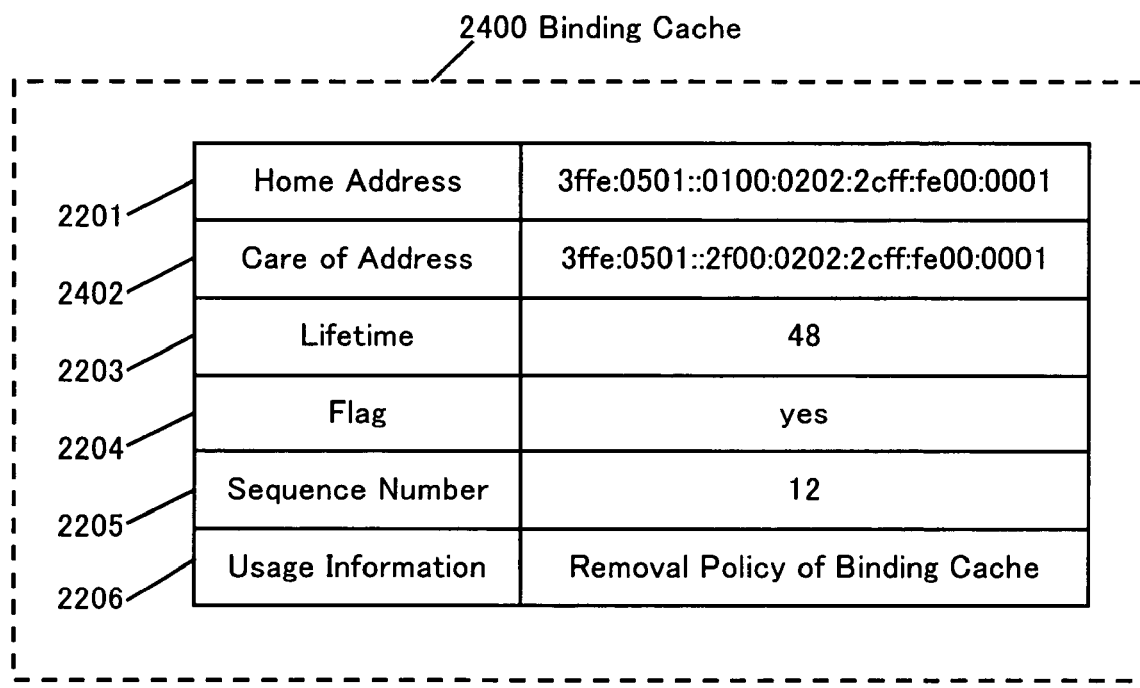
FIG. 28 shows a structure of a binding cache in accordance with the second exemplary embodiment of the present invention.

Next, when mobile router device MR2 cannot find a usable access link but mobile router device MR3 finds the usable access link, what kind of mobility management method is taken is demonstrated hereinafter with reference to FIG. 19 and FIG. 27.

Mobile router devices MR2 and MR3 change their priorities in response to their connection status to backbone network 8. When they can be connected to backbone network 8, a regular priority is used; however as the connection becomes degraded due to, e.g. receiving signal strength becomes weaker, or unable to receive a periodical router advertisement message, the priority is lowered in response to the bandwidth of the network. If no connection is obtained at all, the priority is lowered to zero (0). At this time, if router MR3 can obtain a connection, router MR3 gets a higher priority, and the master router is switched from router MR2 to router MR3.

Figure 19:
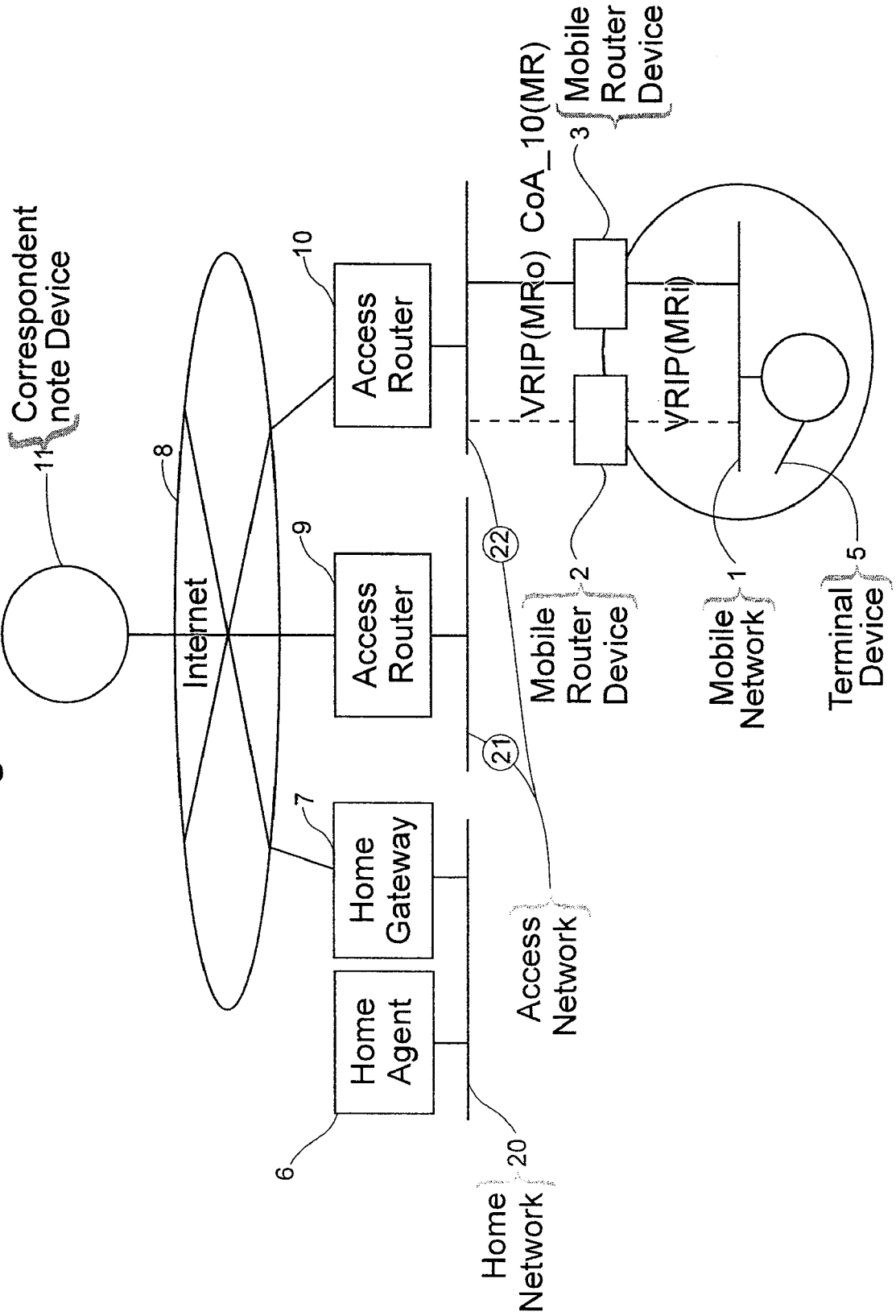
FIG. 19 shows a diagram illustrating a case where a mobile router device, which connects the mobile network to the Internet, is switched over to another one in the network system in accordance with the second exemplary embodiment of the present invention.

As shown in FIG. 19, assume that mobile network 1 leaves access network 21 and moves under access router AR10 having the physical link as same as the MR3's physical interface to the backbone network (S2301). At this time, the connection between router MR2 and backbone network 8 degrades, and router MR2 cannot receive router advertisement message 1010 from access router AR9 (S2310); however, router MR3 receives router advertisement message 1010 from access router AR10 (S2302).

Router MR3 obtains prefix information 1043 from router advertisement message 1010, and generates care of address CoA_10(MR) to be temporarily used under access router AR10 (S2303). For instance, in the case of prefix length 1033 in prefix information option 1030 contained in router advertisement message 1010 being 64 bits, and prefix information 1043 being 3ffe: 0501: :2f00: 3110: 5aff: fe00: 4326, care of address CoA_10(MR) generated corresponding to the VRIP (MRo) is 3ffe: 0501: : 2f00: 0202: 2cff: fe00: 0001. As discussed previously, routers MR2 and MR3 change their priorities in response to the connection status to the backbone network. When the priority of router MR3 becomes higher than that of router MR2, the function of the master router is taken over by router MR3 (S2304).

Figure 22:
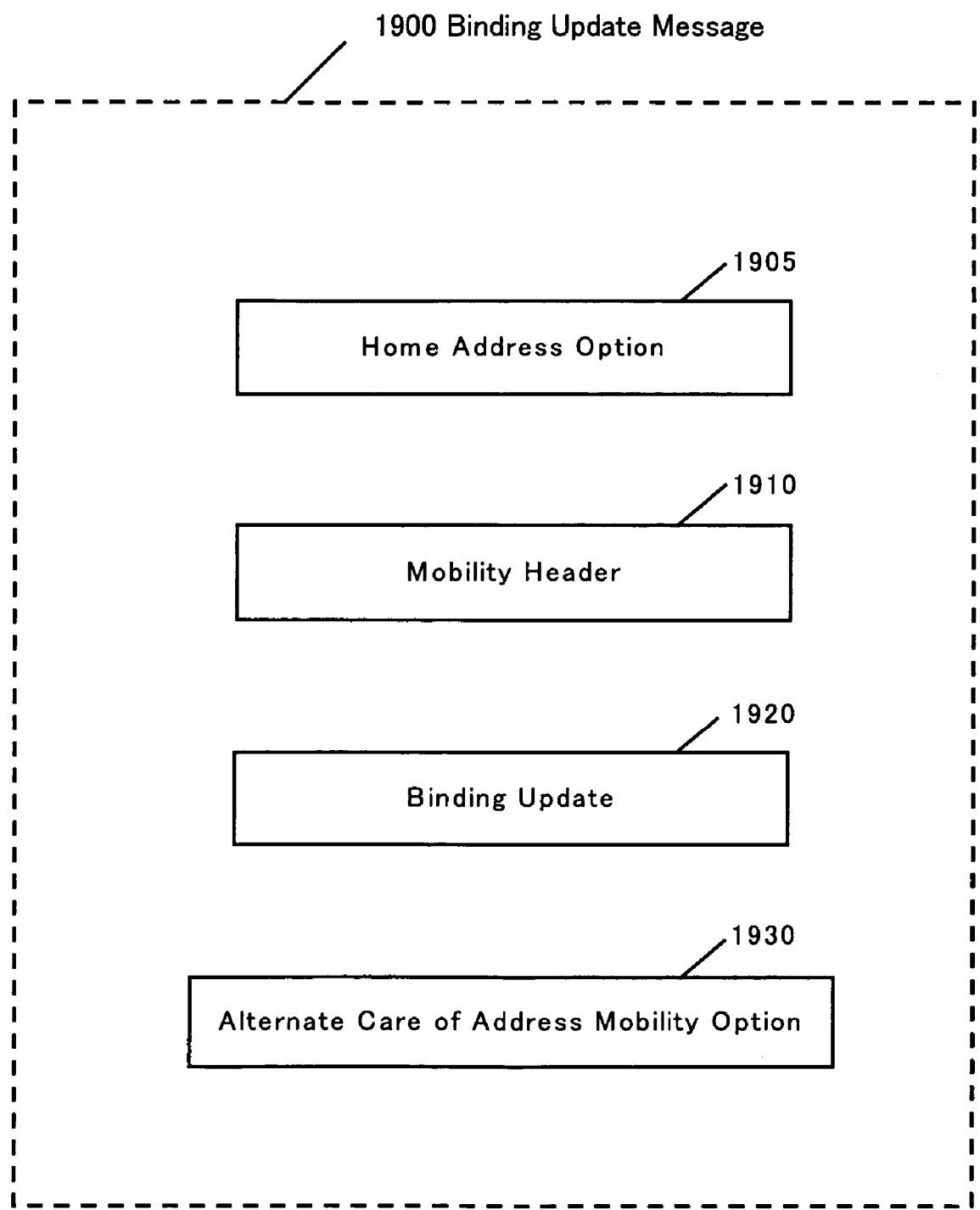
FIG. 22 shows a structure of a binding update message in accordance with the second exemplary embodiment of the present invention.
Figure 23A:
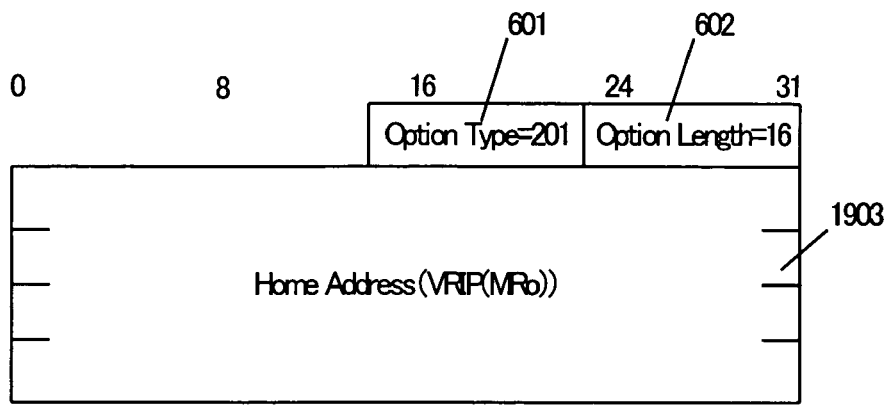
FIG. 23A shows a format of a home address option in the binding update message in accordance with the second exemplary embodiment of the present invention.
Figure 23B:
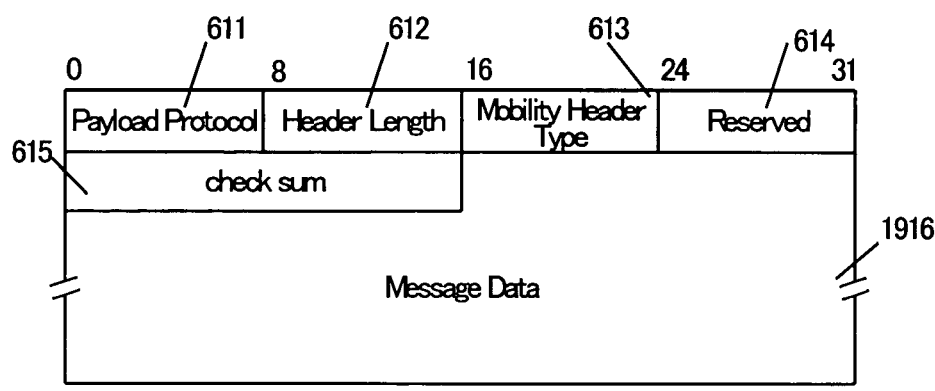
FIG. 23B shows a format of a mobility header in the binding update message in accordance with the second exemplary embodiment of the present invention.
Figure 23C:
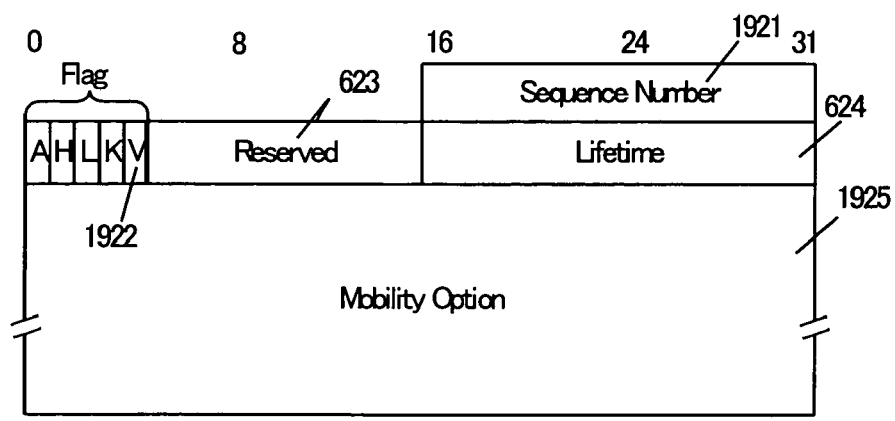
FIG. 23C shows a format of a binding update in the binding update message in accordance with the second exemplary embodiment of the present invention.
Figure 23D:
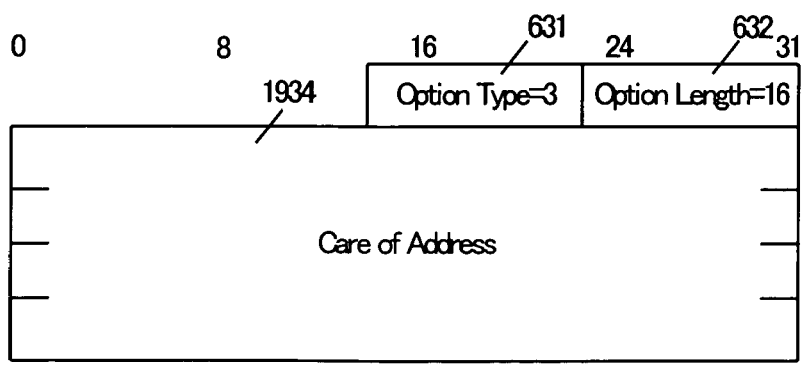
FIG. 23D shows a format of an alternate care of address mobility option in the binding update message in accordance with the second exemplary embodiment of the present invention.

Since router MR3 works as the master router, it generates binding update message 1900 which stores home address VRIP (MRo) 1903, care of address CoA_10(MR) 1934 as shown in FIG. 22 and FIG. 23A (S2305), then transmits it to home agent HA6 (S2306). As a result, its care of address CoA_10(MR) is registered as a primary care of address with home agent HA6 on the home link of router MR3.

Home agent HA6 receives binding update message 1900 from mobile router device MR3, then updates the binding cache entry of home address VRIP (MRo) to binding cache 2400 that associates home address VRIP (MRo) with care of address CoA_10(MR) (S2307), thereby completing a forwarding preparation for the case where the mobile router device, which is expected to connect mobile network 1 to backbone network 8, is switched to another one (S2308).

In the case of transmitting a packet from correspondent node device CN11 to terminal device LFN5, the wording of the description about the case where mobile network 1 is governed by access router AR9 is replaced with the wording of the case where mobile network 1 is governed by access router 10. To be more specific, care of address CoA_9(MR) is replaced with CoA_10(MR), so that the subject case can be appropriately described. Thus the detailed description thereof is omitted here.

Figure 20:
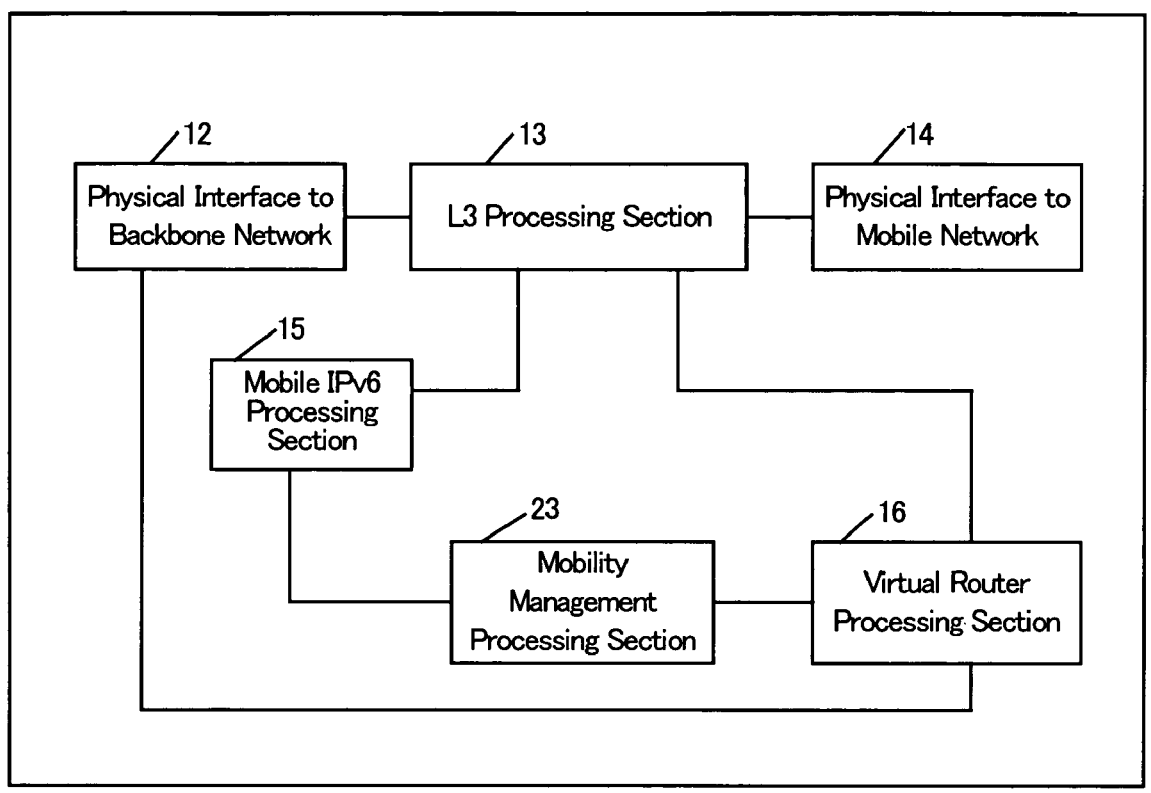
FIG. 20 shows a block diagram illustrating a structure of a mobile router device in accordance with the second exemplary embodiment of the present invention.

FIG. 20 shows a structure of mobile router devices MR2 and MR3. Each one of the mobile router devices comprises the following elements:
physical interface to the backbone network 12;
L3 processing section 13;
physical interface to a mobile network 14;

mobile Ipv6 processing section 15;
virtual router processing section 16; and
mobile management processing section 23.

Physical interface to a backbone network 12 carries out the following processes: processes of the physical layer and the data link layer of a packet received from backbone network 8, process of transferring the packet to L3 processing section 13, and process of providing the packet, received from L3 processing section and destined to backbone network 8, with data link process and physical layer process. On top of those processes, interface 12 further monitors link quality indicating connection status to backbone network 8, and transfers the connection status information to virtual router processing section 16.

Physical interface to a mobile network 14 carries out the following processes: physical layer process and data link layer process of a packet received from mobile network 1, process of transferring the packet to L3 processing section 13, and process of providing the packet, received from L3 processing section and destined to mobile network 1, with data link process and physical layer process.

L3 processing section 13 carries out the following processes: providing a packet, transferred via physical interface to the backbone network 12 or physical interface to the mobile network 14, with network layer process. L3 processing section 13 transfers the packet to Mobile IPv6 processing section 15 if the packet needs Mobile IPv6 process, and transfers the packet to virtual router processing section 16 if the packet needs a virtual router redundancy protocol process. Further, L3 processing section 13 receives the information about whether or not the mobile router device works as the master router from virtual router processing section 16, and when the device works as the master router, it takes a necessary procedure.

Mobile IPv6 processing section 15 provides the packet received from L3 processing section 13 with a packet process based on Mobile IPv6 procedure, then transfers the packet to L3 processing section 13. Mobile IPv6 processing section 15 receives a virtual address and a sequence number from mobility management processing section 23, and generates a packet for carrying out the mobility management of mobile network 1 based on the virtual address, then transfers the packet to L3 processing section 13.

Virtual router processing section 16 carries out the process, based on a virtual router redundancy protocol, for both of the mobile router devices MR2 and MR3 working virtually as a single router in mobile network 1. The process includes the following processes: changing a priority based on the connection status information obtained from physical interface to the backbone network 12; generating a virtual router advertisement packet and transmitting to L3 processing section 13; receiving a virtual router advertisement packet from L3 processing section 13; and recording the information about whether or not the router device works as the master router into mobility management processing section 23. Besides those processes, virtual router processing section 16 transfers a sequence number contained in the virtual router advertisement packet to mobility management processing section 23.

Mobility management processing section 23 records an address to be virtually used at physical interface to the backbone network 12 of a mobile router device in mobile network 1, and retains the sequence number received from virtual router processing section 16. When the mobile router device receives the information about whether or not the router per se works as the master router and determines the router per se is the master router, mobility management processing section 23 further transfers the virtual address and the sequence number to Mobile IPv6 processing section 15 in order to manage the movement by using the virtual address.

A basic operation of mobile router device MR2 shown in FIG. 20 is demonstrated hereinafter. Router MR2 forwards a packet in the following manner, and router MR3 has a similar structure and forwards a packet in a similar way to those of router MR2.

Mobile router device MR2 monitors its own status managed by virtual router processing section 16, and recognizes whether or not router MR2 per se works as the master router. In the case of router MR2 working as the master router, router MR2 receives the packet received from backbone network 8, and the packet undergoes physical layer protocol process and data link protocol process in physical interface to backbone network 12. Then router MR2 forwards the packet to L3 processing section 13 where the packet undergoes IP process, while Mobile IPv6 processing section 15 carries out IP header process, which is redundant to Mobile IPv6, according to the Mobile IPv6 procedure. After the routing process in L3 processing section 13, the packet is forwarded to one of physical interface to the backbone network 12 or physical interface to the mobile network 14.

On the other hand, a packet received from mobile network 1 undergoes the process by physical interface to mobile network 14, and is forwarded to L3 processing section 13 where the packet undergoes IP protocol process, while Mobile IPv6 processing section 15 carries out IP header process, which is redundant to Mobile IPv6, according to the Mobile IPv6 procedure. After the routing process in L3 processing section 13, the packet is forwarded to one of physical interface to the backbone network 12 or physical interface to the mobile network 14.

When router MR2 works per se as a backup router, router MR 2 disposes of a packet to be forwarded without any processes regarding the packet.

Figure 21:
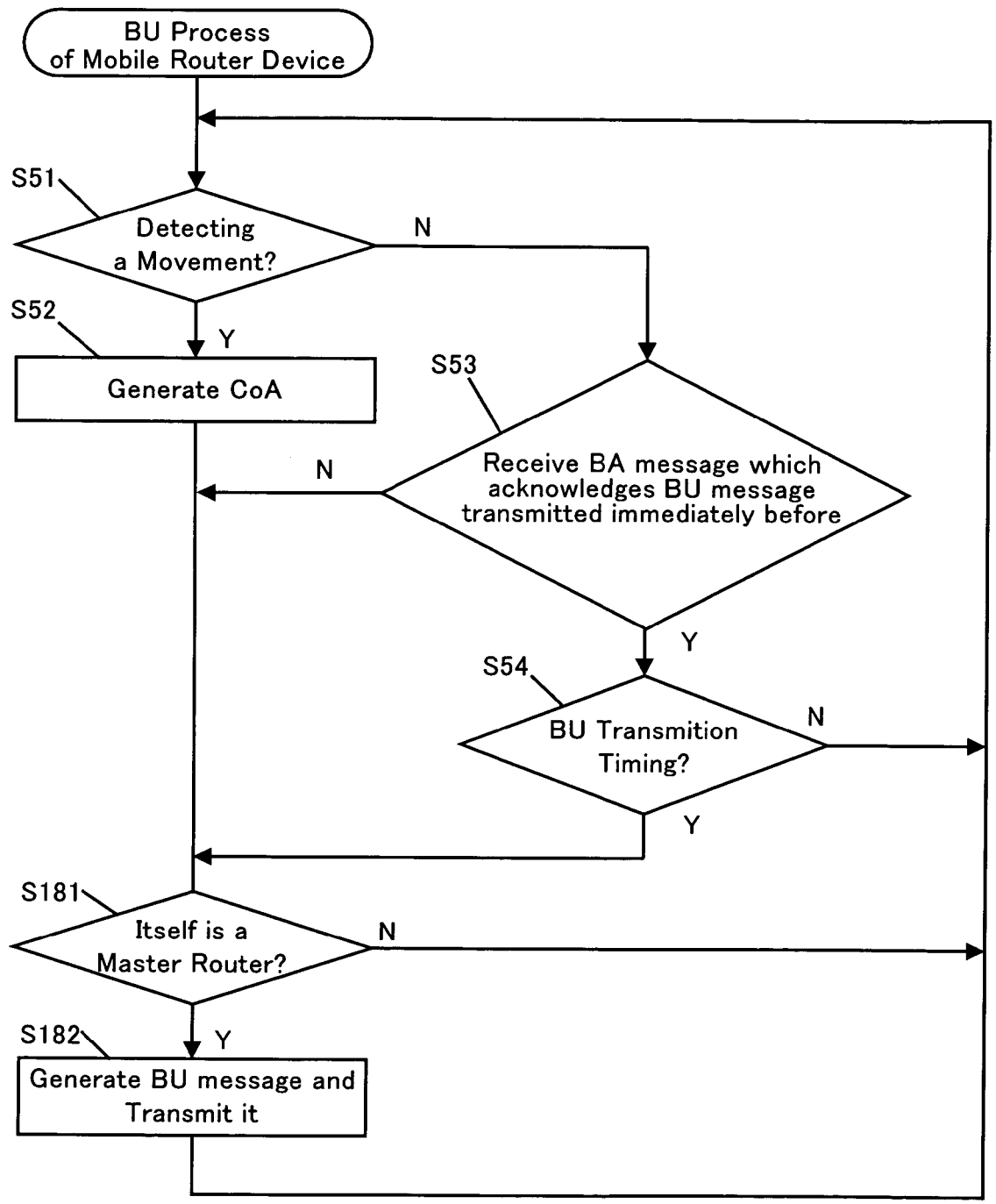
FIG. 21 shows a flowchart illustrating a process flow of updating a binding in accordance with the second exemplary embodiment of the present invention.

FIG. 21-FIG. 23 describe how mobile router device MR2 updates the binding when mobile network 1 leaves home network 20. FIG. 21 shows a flowchart illustrating the update procedure of mobile router device MR2. When router MR2 detects the movement of mobile network 1 (S51), router MR2 generates a care of address by using prefix information 1043 contained in router advertisement message 1010 and the virtual address (S52). After the generation of the care of address, router MR2 determines whether or not it works as the master router (S181). In the case of router MR2 working as the master router, router MR2 generates and transmits binding update message 1900 shown in FIG. 22 (S182).

Binding update message 1900 comprises the following elements:
home address option 1905 and mobility header 1910 included in extension header of IPv6 address option header;
binding update 1920 included in a message data of the mobility header; and
alternate care of address option 1930 included in a mobility option of the binding update.

Home address option 1905 stores the virtual address instead of the home address of the router per se in home address field 1903. V-flag 1922 indicating the transportation of the virtual address is newly prepared in binding update 1920.

If router MR2 does not detect the movement of mobile network 1, router MR2 determines whether or not L3 processing section 13 receives a binding acknowledgement message about the binding update message transmitted immediately before (S53). This determination is then examined whether or not the determination is carried out based on the lapse of the lifetime of the binding update message transmitted immediately before (S54). In the case of router MR2 per se working as a master router (S181), router MR2 generates and transmits binding update message 1900 when necessary (S182).

After the transmission of binding update message 1900, mobility management processing section 23 updates its retaining sequence number to the number stored in sequence number field 1921 of binding update message 1900 transmitted.

Meanwhile, the detection of movement in S51 is applicable not only to the case where the node to the Internet 8 is changed due to the movement of mobile network 1, but also to another case where the operation of router MR2 is physically changed from a backup router to a master router due to the virtual router redundancy protocol booted on the side of mobile network 20.

Figure 29:
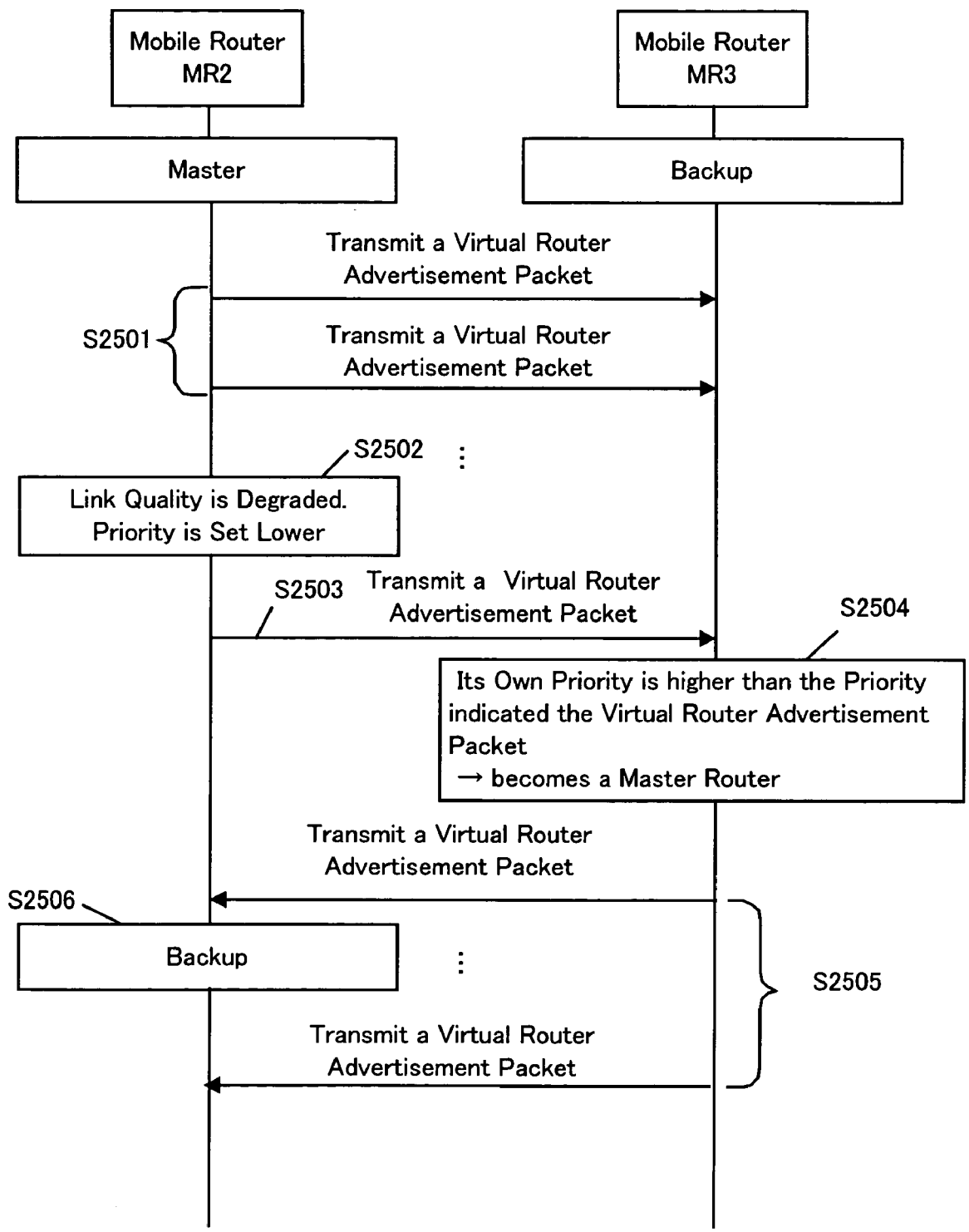
FIG. 29 shows a sequence diagram of a virtual router redundancy protocol in accordance with the second exemplary embodiment of the present invention.

The function of a master router is transferred from router MR2 to router MR3 due to degradation of the link environment. The procedure of such a case is described hereinafter with reference to FIG. 29 illustrating a sequence in accordance with the virtual router redundancy protocol. In the first place, router MR2 works as a master router, and router MR3 works as a backup router.

Figure 30:
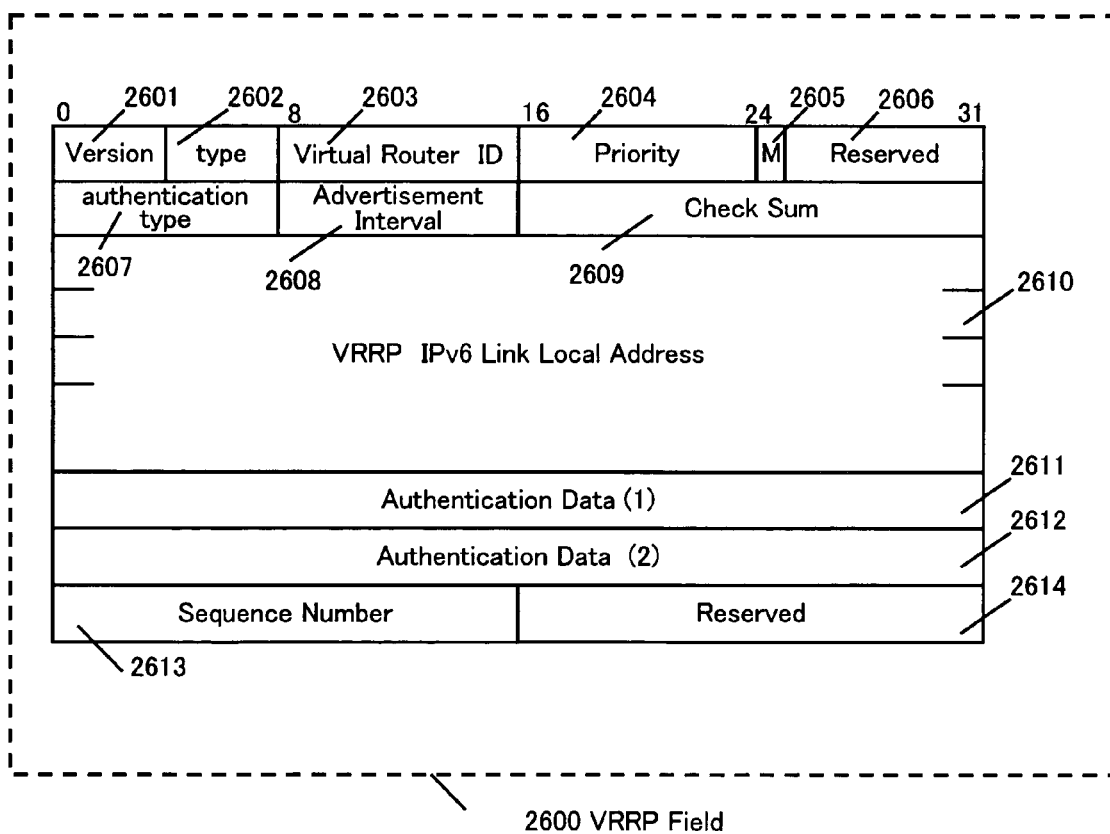
FIG. 30 shows a format of a VRRP field in accordance with the second exemplary embodiment of the present invention.

Mobile router device MR2 working as the master router periodically transmits a virtual router advertisement packet including VRRP field 2600 shown in FIG. 30 from physical interface to the mobile network 14 (S2501). This packet includes priority information of mobile router devices and an advertisement interval. If the priority information in the packet is lower than the priority of the backup router or the backup router does not receive the virtual router advertisement packet within a given time predetermined in response to the advertisement interval, a mobile router device working as a backup router determines that the present master router is not fit for the function, so that it takes over the master router by itself.

If the movement of mobile network 1 causes degradation of the quality of the communication link between router MR2 and access router AR9, the priority is lowered by virtual router processing section 16 in router MR2 (S2502). Router MR2 stores the priority lowered due to the degradation of the link quality, and still transmits periodically the virtual advertisement packet (S2503).

When receiving the virtual advertisement packet, router MR3 refers to the priority information in the virtual router advertisement packet, and verifies whether or not the priority is lower than that of itself. If the priority of itself is higher than that stored in the packet, router MR3 takes over the function of the master router (S2504).

Mobile router device MR3 taking over the function of the master router transmits periodically the virtual router advertisement packet, which contains its own priority, from physical interface to the mobile network 14 (S2505).

When router MR2 receives the virtual router advertisement packet which contains the priority higher than its own priority (S2505), router MR2 becomes a backup router (S2506), and stops transmitting the virtual advertisement packet as well as processing as the master router.

The VRRP field of the virtual router advertisement packet in accordance with this second exemplary embodiment has M-flag 2605 shown in FIG. 30, which M-flag a conventional VRRP field does not have. When this bit is set, a virtual redundant router works in the mobile router device, and this work indicates that VRRP field 2600 contains sequence number field 2613. A value stored in sequence number field 1921 at binding update message 1900 produced immediately before is stored in sequence number field 2613. In the case of a switchover of the master router, the value of sequence number field 2613 is added by 1 (one), then put into binding update message 1900.

Figure 24:
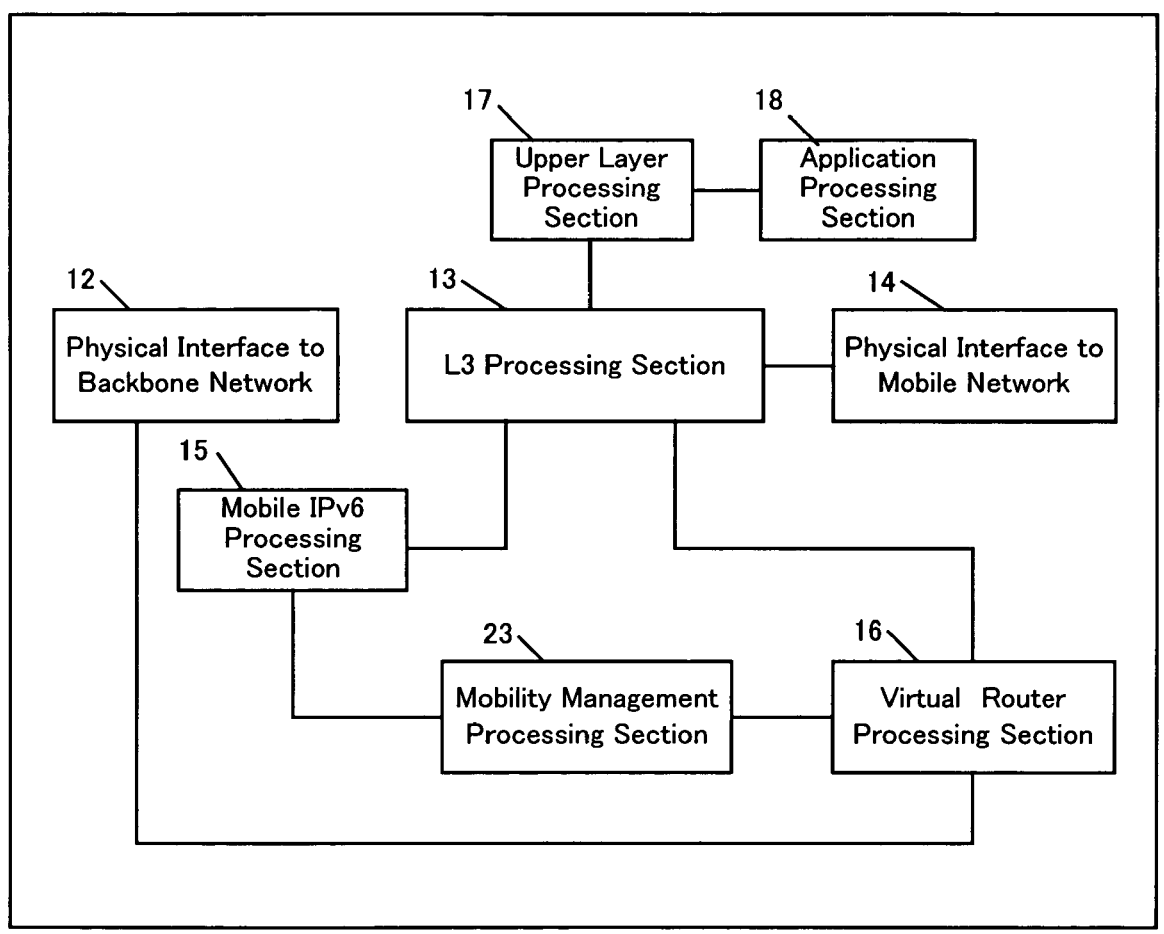
FIG. 24 shows a block diagram illustrating a structure of a mobile router device in accordance with the second exemplary embodiment of the present invention.

Router MR2 can have a function of generating and transmitting a data packet by itself as well as a function of receiving a data packet as a termination. FIG. 24 shows a structure in such a case. This structure is basically similar to what is shown in FIG. 20; however, this structure further includes upper layer processing section 17, which carries out the process of upper layers such as TCP and UDP, and application processing section 18.

A basic operation of foregoing mobile router MR2 is demonstrated hereinafter: Router MR2 shown in FIG. 24 starts transmitting in the following manner: Transmission data generated by application processing section 18 for transmission to the Internet 8 is forwarded to L3 processing section 13, where IP protocol process is carried out, via upper layer processing section 17 where process is carried out following the protocol such as Sockets, TCP, or UDP. At the same time as the IP process, Mobile IPv6 processing section 15, which carries out the process according to Mobile IPv6 procedure, carries out IP header process redundant to Mobile IPv6. The transmission data then undergoes data link protocol process and physical layer protocol process in physical interface to the backbone network 12. The transmission data is finally transmitted to backbone network 8.

At this time, the source address uses the care of address corresponding to the original home address or the original home address per se for carrying out a communication, so that the binding update process for the care of address is processed by a regular Mobile IPv6 process regardless of a master or a backup specified by the virtual router redundancy protocol.

Application processing section 18 of router MR2 generates the transmission data for the transmission to mobile network 1, the data is forwarded to L3 processing section 13, via upper layer processing section 17 where process is carried out following the protocol such as Sockets, TCP, or UDP. The transmission data then undergoes a data link protocol process and a physical layer protocol process in physical interface to the mobile network 14. The transmission data is finally transmitted to mobile network 1.

Router MR2 receives data as a termination, and this reception operation is demonstrated hereinafter, namely, it is reverse to the transmission operation discussed above.

A packet received from backbone network 8 undergoes a physical layer protocol process and a data link protocol process in physical interface to the backbone network 12, then undergoes an IP protocol process in L3 processing section 13. During the IP protocol process, Mobile IPv6 processing section 15 carries out a redundant IP header process at the same time. Then the packet undergoes the process by upper layer processing section 17, and the packet is forwarded to application processing section 18.

After the packet received from mobile network 1 undergoes the physical layer protocol process and the data link protocol process in physical interface to the mobile network 14, the packet undergoes the IP protocol process in L3 processing section 13. Then the packet undergoes the process by upper layer processing section 17, and the packet is forwarded to application processing section 18.

Meanwhile, this embodiment uses two mobile router devices and one terminal device; however, not to mention, this embodiment can be applied to the case where a greater number of devices are used.

As discussed above, in a mobile network to which plural mobile router devices attach, a virtual address is used to the mobile router devices' physical interface to the backbone network. A virtual router redundancy protocol is booted at the physical interface to a mobile network. The virtual address of the physical interface to the backbone network and the care of address corresponding to this virtual address are used for binding update process, so that a terminal device in the mobile network having no Mobile IPv6 can carry out communications without increasing load to the mobile network while the terminal device moves among various access networks.

INDUSTRIAL APPLICABILITY

In the case of providing plural mobile router devices which are capable of connecting the mobile network to an access network, the present invention achieves to switch a mobile router device to another one without increasing load to the network. The present invention is applicable to a mobile network system that moves among different access networks in a backbone network considered as a whole to be one network.

The invention claimed is:

1. A mobile router device, to which at least one terminal device attaches, connects a backbone network, having a plurality of access routers, to a mobile network at a first location via a first access router of the plurality of access routers, the mobile network moving within the backbone network by moving to a second location and connecting to a second access router of the plurality of access routers, the mobile router device comprising:
   a means for determining whether or not the mobile router device works as a master router that can connect the mobile network to the backbone network;
   a means for recording a virtual address common to the mobile router device attaching to the mobile network at the first location and the second location, and producing a care of address with respect to the virtual address and usable by the mobile router device at the second location; and
   a means for generating and transmitting a binding update message which makes the virtual address corresponding to the care of address when the mobile router device works as the master router,
   wherein,
   the mobile network further includes a backup router device, and
   if the backup router device determines the connection to the backbone network is lost between the mobile router device and the first access router, the backup router device transmits another binding update message that includes the virtual address corresponding to the mobile router device and another care of address corresponding to the backup router device.

2. The mobile router device of claim 1, wherein the virtual address is used as a real address assigned to any one of the respective mobile router devices attaching to the mobile network.

3. The mobile router device of claim 1 further comprising:
   a means for monitoring quality of a link connected to the backbone network;
   a means for changing a priority which determines the master router and a backup router in response to the quality of the link; and
   a means for determining whether or not the mobile router device per se works as the master router in response to the priority.

4. The mobile router device of claim 1 further comprising a means for storing a sequence number of the binding update message into a master router advertisement packet and for transmitting the packet when the mobile router device works as the master router.

5. The mobile router device of claim 4, wherein the master router advertisement packet uses a virtual router advertisement in accordance with a virtual router redundancy protocol.

6. The mobile router device of claim 4, wherein the master router advertisement packet uses IPv6 router advertisement message.

7. The mobile router device of claim 1 further comprising:
   a means for receiving a master router advertisement packet which is transmitted by another mobile router device and notifies the mobile router device of the another mobile router device working as the master router; and
   a means for recording a sequence number of the binding update message contained in the master router advertisement packet received in order to use the sequence number for a case when the mobile router device per se becomes the master router,
   when the mobile router device works as a backup router.

8. The mobile router device of claim 7, wherein the master router advertisement packet uses a virtual router advertisement in accordance with a virtual router redundancy protocol.

9. The mobile router device of claim 7, wherein the master router advertisement packet uses IPv6 router advertisement message.

10. A mobile network system comprising:
    a plurality of the mobile router devices as defined in claim 1;
    at least one terminal device attaching to the mobile router devices; and
    a home agent device for managing movements of the mobile router devices.

11. The mobile network system of claim 10, wherein at least one of the mobile router devices has a physical interface to a backbone network, a type of which interface is a different from those of other mobile router devices.

12. The mobile network system of claim 10, wherein each one of the mobile router devices uses a virtual address common to the others at a side to a backbone network and implements a virtual router redundancy protocol at a side to a mobile network, wherein when one of the mobile router devices works as a master router, the master router uses the common virtual address for communication.

13. The mobile network system of claim 12, wherein one of the mobile router device working as the master router uses the common virtual address and a care of address generated corresponding to the common virtual address for transmitting a binding update message to be used for a mobility management to the home agent device.

14. A mobile router device attaching to a mobile network system, the system comprising:
    at least one terminal device;
    a mobile network including a plurality of mobile router devices, to which the terminal device attaches, for coupling the mobile network to a backbone network, the plurality of mobile router devices including a master router device and a backup router device; and
    a home agent device for associating a home address with a care of address and managing both of the addresses,
    wherein,
    the mobile network moves from being connected to a home network at a first location within the backbone network to a second location within the backbone network,
    when the master router device at the first location continues to work as the master router after the mobile network moves to the second location, the management method associates a care of address corresponding to a virtual address generated after the movement to the second location with the virtual address and registers the care of address with the home agent device, and, and if the backup router device determines the connection to the backbone network is lost between the master router device and the backbone network, the backup router device transmits a binding update message that includes the virtual address corresponding to the master router device and another care of address corresponding to the backup router device.

15. The mobile router device as defined in claim 14, wherein the virtual address is any one of physical addresses to be used in physical interfaces, to the backbone network, when each one of the mobile router devices attaching to the mobile network is connected to the home network.

16. The mobile router device as defined in claim 14, wherein the virtual address and a sequence number of another binding update message to be transmitted to the home agent device is included in a master router advertisement packet to be transmitted to the mobile network for notifying the home agent device of the mobile router device being to work as the master router.

17. The mobile router device as defined in claim 16, wherein the master router advertisement packet is a virtual router advertisement packet to be used by a virtual router redundancy protocol implemented in the mobile router device at a side to the mobile network.

18. The mobile router device as defined in claim 16, wherein the master router advertisement packet includes IPv6 router advertisement message to be transmitted from the mobile router device working as the master router to a side of the mobile network of the mobile router device.

* * * * *